US005749077A

United States Patent [19]
Campbell

[11] Patent Number: 5,749,077
[45] Date of Patent: May 5, 1998

[54] METHOD AND APPARATUS FOR UPDATING AND SELECTIVELY ACCESSING FINANCIAL RECORDS RELATED TO INVESTMENTS

[75] Inventor: David Campbell, Pittsburgh, Pa.

[73] Assignee: FS Holdings, Inc., Wilmington, Del.

[21] Appl. No.: 787,679

[22] Filed: Jan. 23, 1997

Related U.S. Application Data

[62] Division of Ser. No. 345,881, Nov. 28, 1994.

[51] Int. Cl.$^6$ ............................................. G06F 15/21
[52] U.S. Cl. ............................................. 705/36
[58] Field of Search ........................... 395/610, 615; 705/35, 36, 37

[56] References Cited

U.S. PATENT DOCUMENTS

| | | | |
|---|---|---|---|
| 4,774,663 | 9/1988 | Musmanno et al. | 705/36 |
| 4,994,964 | 2/1991 | Wolfberg et al. | 705/36 |
| 5,481,700 | 1/1996 | Thuraisingham | 705/36 |

OTHER PUBLICATIONS

P. J. Gill, Schwab Bets the Bank on Information Systems, Information Week, p 7A, 10A Oct. 5, 1987.

M. W. Friis, Getting the Jump on Big New York Brokerage Firms, Infosystems, pp. 86, 88, May 1987.

*Primary Examiner*—Gail O. Hayes
*Assistant Examiner*—Junghoon Kenneth Oh
*Attorney, Agent, or Firm*—Arnold B. Silverman; Eckert Seamans Cherin & Mellott, LLC

[57] ABSTRACT

A method and apparatus for inputting financial data, modifying, formatting and adding to pre-existing data on the basis of such input and, if desired, engaging in further processing of the data and accessing the data through a computer interface which may be directly accessed by unskilled and semi-skilled personnel. Such personnel may introduce a wide range of parameters for purposes of selecting specific desired data. The system is particularly advantageous in respect of maintaining records of investment transactions and providing ready access to the same. In the preferred approach, for selected categories of information, the user may elect one of three options as to each screen field to obtain rapid, customized information delivery. Also, the system preferably employs parallel processing and database performing tuning techniques. Hierarchical processing is employed in certain embodiments of the invention.

88 Claims, 22 Drawing Sheets

METHOD AND APPARATUS FOR UPDATING AND SELECTIVELY ACCESSING FINANCIAL RECORDS RELATED TO INVESTMENTS

This is a division of application Ser. No. 08/345,881, filed Nov. 28, 1994.

BACKGROUND OF THE INVENTION

1. Field of the Invention

This invention relates to a system for rapid and efficient processing of large volumes of raw data, such as financial data and reformatting the same, so as to facilitate ready selective access thereto on-line.

2. Description of the Prior Art

It has long been known in connection with various types of financial and accounting transactions to make advantageous use of computerized handling, sorting, storage, formatting and delivery thereof on-line in a user friendly manner.

It has been known, for example, to employ such systems in respect of the purchase and sale of stocks, bonds and mutual funds. Such computerized systems frequently provide for entering of orders to purchase or sell such investments with appropriate identification of the buyer, seller, the particular investment being bought or sold, the quantity and dollar amounts of such sales, along with all associated costs, commissions, taxes and the like.

It has long been known to employ general purpose digital computers and accompanying software to perform financial and accounting functions. See, generally, U.S. Pat. Nos. 4,648,037, 4,953,085, 4,994,464, 5,126,936 and 5,132,899.

It has also been known to use such data processing systems for automated processing of information relating to investments and investment accounts. See, generally, U.S. Pat. Nos. 4,346,442, 4,486,543, 4,566,066, and 5,193,056.

It has also been known to employ computerized systems for monitoring investment accounts involving multiple investors and multiple investment funds. See U.S. Pat. No. 4,933,842.

With the increased pressure of having such systems handle hundreds of thousands, if not millions of transactions daily, the ability to process such transactions in an efficient and accurate manner while providing for rapid on-line access thereto on the basis of a large number of optional parameters, has created a substantial need for improved systems.

The present invention has met this need in a manner which will be described hereinafter.

SUMMARY OF THE PRESENT INVENTION

The present invention has met the above-described need by providing a method of inputting raw data, assimilating, characterizing and reformatting the same with retrieval being effected by any of a plurality of desired parameters.

The invention contemplates retrieval of sales information, asset information and other similar types of information.

The invention also preferably employs computer processing wherein answers to certain queries may be achieved in a rapid and efficient manner by users who are relatively unsophisticated in respect of computerized systems. The system employs logic processing parameters in accordance with a plurality of user options in respect of the nature and amount of information requested through user selected parameters.

The present invention also contemplates providing such a system which makes use of parallel processing and advanced database performance tuning technology to achieve the desired results through hierarchical means as to certain categories of information, such as attribution of credit for a sale or other transaction.

It is an object of the present invention to provide an automated system for the receipt, rapid processing, and formatting of financial information in such a manner as to facilitate rapid, user friendly access to such information through a wide variety of parameters.

It is another object of the present invention to provide such a system wherein means may be employed so as to permit selection of a particular parameter based upon satisfaction of other informational requirements and the data being sought.

It is a further object of the present invention to provide such a system which is readily employable with mutual funds in the monitoring of sales, redemptions, exchanges, reinvestments and other transactions.

It is a further object of the invention to provide such a system wherein the data may readily be employed to update information already contained within the system relating to a plurality of categories of information and may also be employed to establish new files in desired categories.

It is a further object of the invention to provide such a system which is adapted to be employed with the requested information being presented to the user through dynamic screens to facilitate user efficiency.

It is a further object of the present invention to provide apparatus and an associated method wherein sales or asset information may be provided with varying degrees of specificity due to user parameter selection and unique computer handling of large volumes of data relating to investments.

It is a further object of the present invention to provide a system for processing large volumes of mutual fund information on a daily basis while providing user friendly access to sales and asset data.

It is a further object of the invention to provide such a system wherein data may be accessed with different degrees of specificity depending upon which labeled fields on the user screen are responded to by the user and the specific user response, if any.

These and other objects of the invention will be more fully understood from the following description of the invention on reference to the drawings contained herein.

DESCRIPTION OF THE PREFERRED EMBODIMENTS

As used herein, the term "information unit" shall refer to a single piece of information which may be expressed in words, numbers or both. The information may include, for example identification of a dealer, a branch which is a specific location of a dealer, a one or more representatives who may have been involved in a transaction, the date of a transaction, the nature of the security involved, the selling price, the commission, applicable taxes, 12(b)1 fees, the quantity of securities transferred, the nature of the transaction, inventory amounts within an account, and other financial and related information.

As used herein the term "securities" shall expressly include, but not be limited to mutual funds, common and preferred shares of stock, whether listed on an exchange or not, corporate bonds, United States bills, notes and bonds.

While for purposes of simplicity of disclosure herein, where specific reference is made to a type of system, emphasis will be placed upon the processing of information relating to investment securities, the invention is not so limited and may be employed to process a wide range of financial and accounting type information. Within the context of the specific example, the various types of information which is delivered to the user responsive to user requests, may be employed as administrative tools in marketing and sales efforts, as well as investment product creation and legal compliance, for example.

Figure 1:
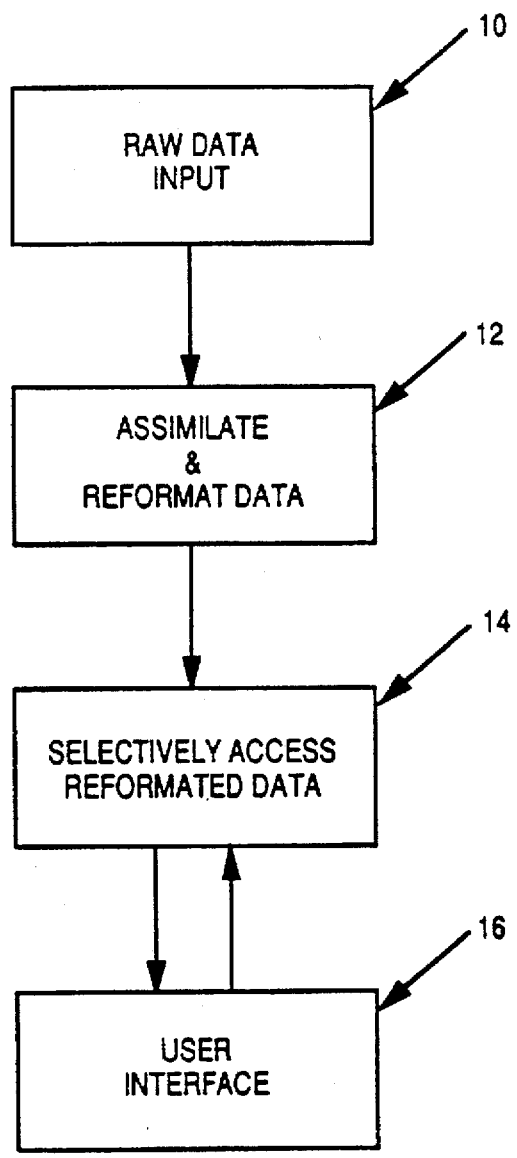
FIG. 1 is a schematic flow chart illustrating a general overview of the system of the present invention.

Referring to FIG. 1, by way of general overview, it will be seen that the system, which includes a computer with a central processing unit and associated controls and interfaces, has a large volume of raw data input 10 which is received within the system and, in accordance with predetermined programs, is assimilated and reformatted 12 so as to establish a plurality of storage categories which will rapidly interact so as to provide a user with selective access to the reformatted data 14 in accordance with parameters 16 introduced at the user interface provided by a user. In a preferred embodiment of the invention, the input parameters will be employed as responses to labeled fields on the user interface screen. These responses may include responses to all of the fields, some of the fields, or none of the fields. Also, each response may involve different degrees of specificity.

It is also preferred in the present system to employ a dynamic screen so that unused fields in the response information provided to the user are eliminated from the screen, thereby, enhancing ease of use of the system on-line. It will be appreciated that while reference will be made herein to use on-line, the information, in addition to being displayed on a monitor, may be delivered in the form of hard copy, may be enhanced, or otherwise stored.

Figure 2A:
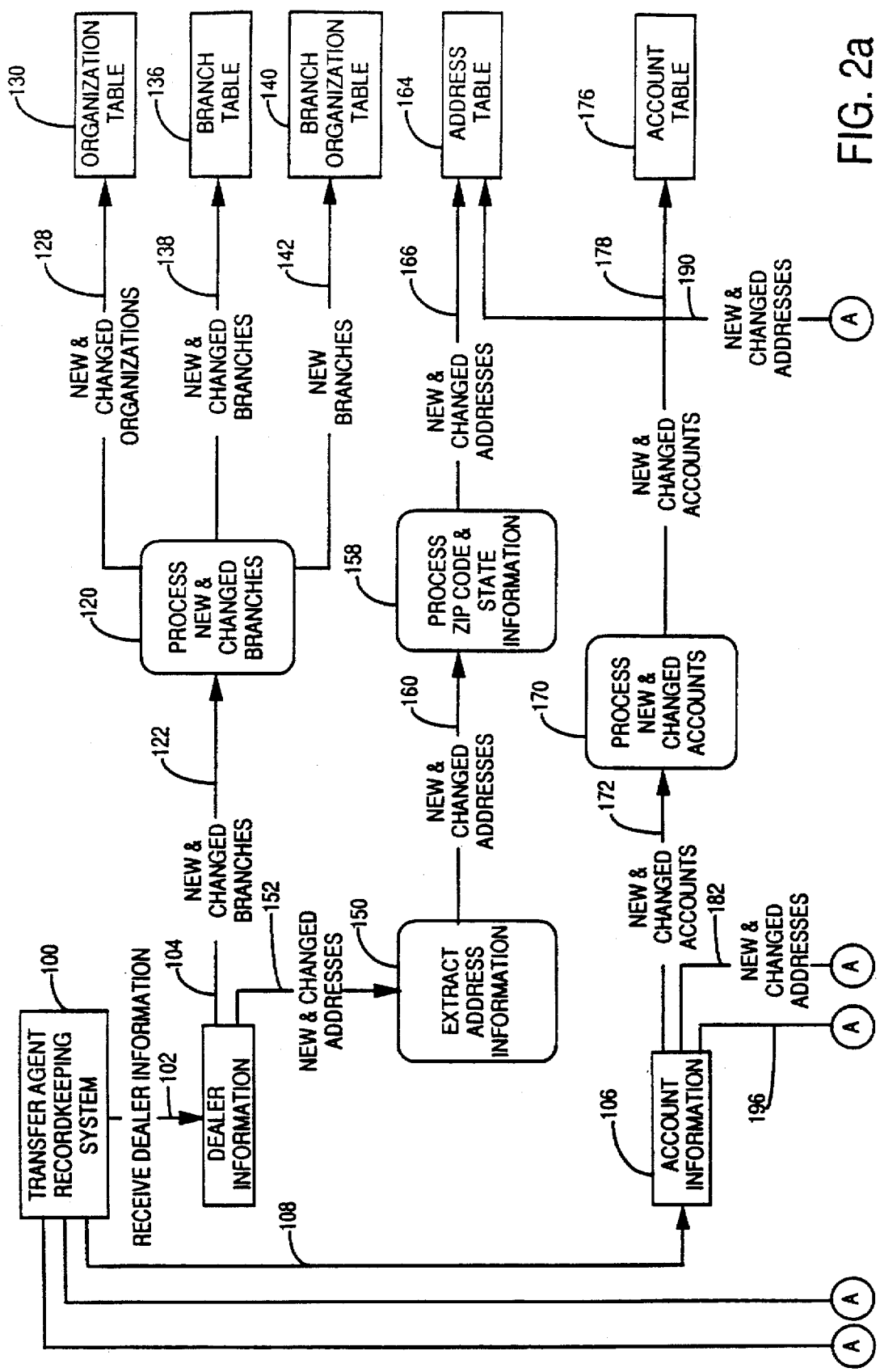
FIG. 2a through 2c, when assembled, are a schematic illustration showing the initial processing of information received by the system of the present invention.
Figure 2B:
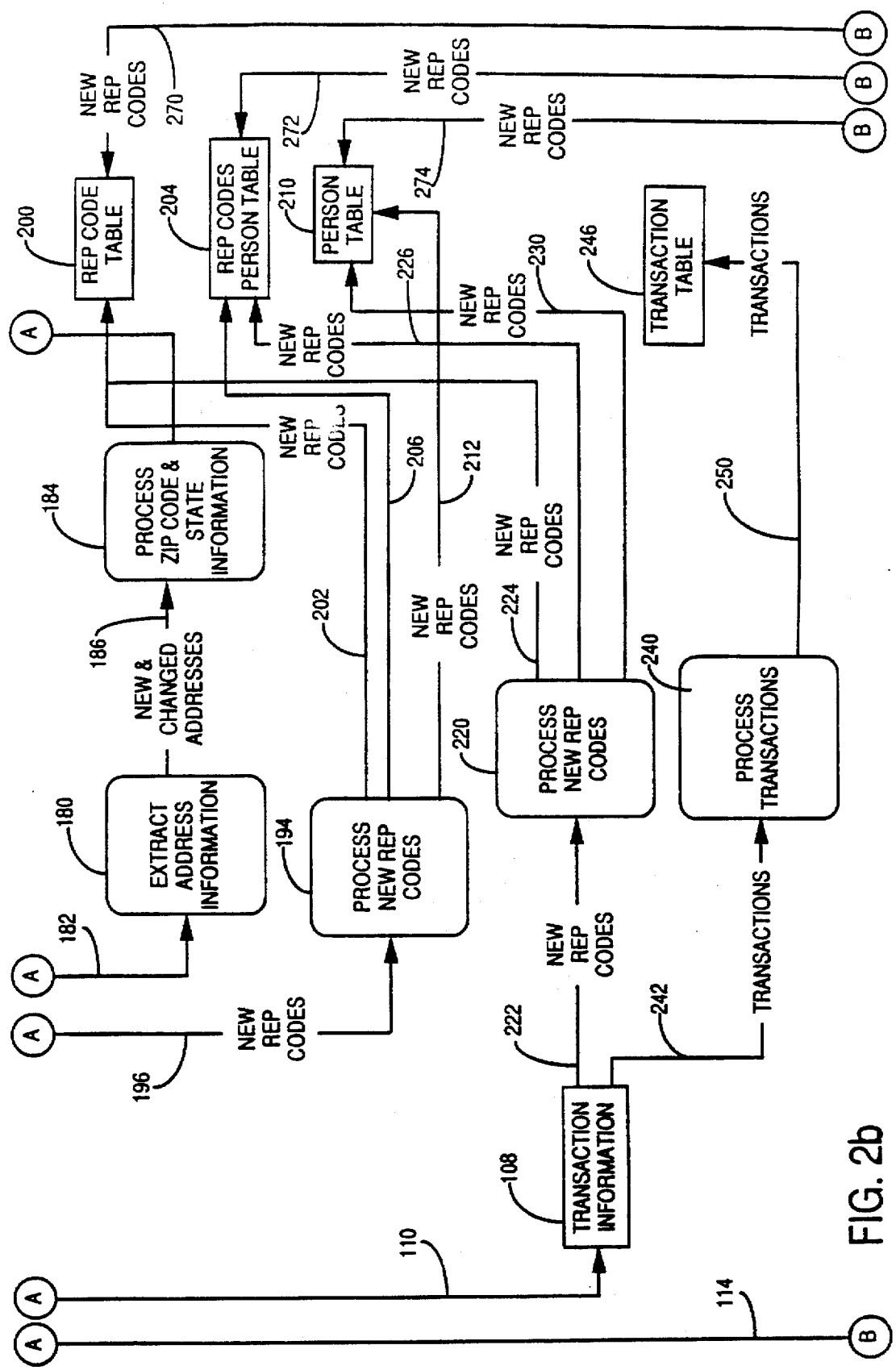
Figure 2C:
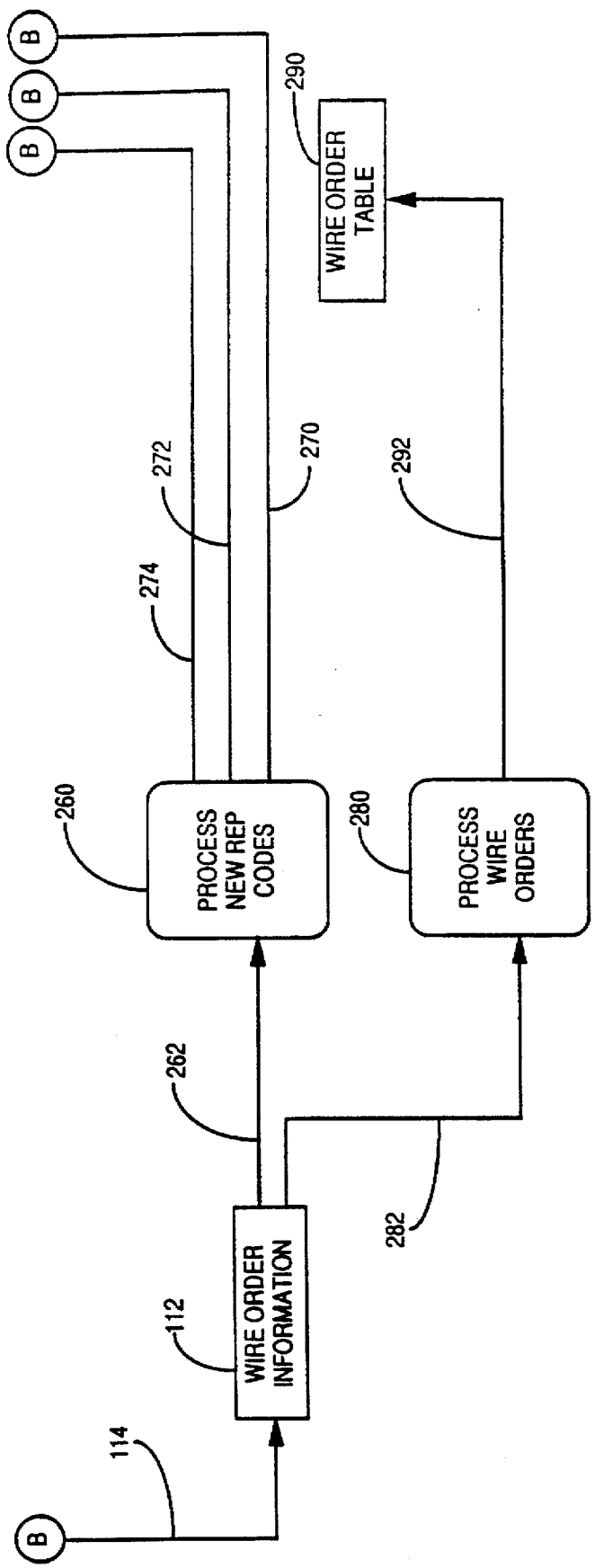

FIGS. 2a through 2c may be assembled by matching the circled letters. Referring to FIG. 2, the manner in which incoming data may be assimilated and reformatted will be considered. A source of data 100, such as a transfer agent, may be located at a remote location and deliver raw data by telephone connection, for example. A mutual fund complex, which will be employed as an example of a financial system herein, receives data over path 102 in the nature of mutual fund dealer information 104. It also provides account information 106 over path 108 and transaction information 108 over path 110. Wire order information 112 is provided over path 114. This data may be raw data.

The dealer information unit 104 provides data for processing regarding new and changed branches 120 over path 122. This information is passed on to organization table 130 over path 128 in order to update the stored listing of organization names and locations. New and changed branch information 120 is delivered to branch table 136 by path 138. This branch information 120 may include the name of the branch and any identification numbers or codes. Also, information regarding new branches is delivered to branch organization table 140 by path 142. Dealer information 104 also provides information on new and changed addresses to extract address information 150 by route 152, wherein the address information is extracted. The new and changed address information is directed to processing of zip code and state information 158 by path 160 which, in turn, delivers the information to address table 164 by path 166. In the process stations, such as 120, 150, 158, for example, the raw data is processed to extract informational units of the desired categories. This processing may be achieved by suitable logic functioning known to those skilled in the art.

It will be appreciated that, in this manner, the information contained within the computer memory in tables 130, 136, 140 and 164, which may be considered first data, as it existed prior to introduction of the raw data (second data) from transfer agent 100, is combined to create updated or third data regarding dealers. The third data will contain the original first data and both dealer information which has been revised and new listings. This third data may be selectively accessed through the user interface in a manner to be discussed in detail hereinafter. The information contained within the information lists may be accessed through several user options which may involve (a) a first option entered in any subject category field on the screen to provide a specific response, or (b) a second option which calls for all information in a category through computer combination of specific information lists or (c) a third default option where no information is placed in a category and a summary is provided to the user. The computer logic provides for unique creation of organized list tables containing the third data which is readily retrievable in a selective manner in accordance with the user elected options as to each labeled field on the screen. For simplicity of disclosure herein, reference will be made to these three types of data. By way of example, if second data is delivered every evening, data, which prior to such delivery is first data, will be combined with second data to create third data. Such third data will be considered the "first data" for the delivery of "second data" on the following day.

Similarly, the transfer agent 100 also delivers account information 106 by path 108. The station for processing new and changed accounts 170 receive information by path 172 for further processing with the information going ultimately to account table 176 by path 178. The account information 106 also delivers new and changed address information to the station 180 where address information is extracted by path 182 which extracted information is, in turn, delivered to zip code and state information processing station 184 by path 186. The zip code and state information is then delivered to the address table 164 by path 190. It will be appreciated, in this manner, that changes in dealer information and account information in respect of tables 130, 136, 140, 164 have been adjusted in accordance with the incoming data.

As used herein, the term "dealer" shall refer to a legal entity, such as a corporation or a partnership, for example, which is an organization involved in investment transactions in a sales or redemption capacity.

As used herein, the term "branch" will refer to a particular location or office of a dealer.

As used herein, "representative" shall refer to an individual who sells or redeems investments.

Account information 106 provides to the processing station new representative codes 194 by path 196 for further processing. A representative code table 200 receives the new rep codes by path 202 from the unit 194 which processes new rep codes. The new rep codes are added to rep code table 200. The processed new codes are also delivered to the rep code person table 204 by path 206 and to the person table 210 by path 212 with the former listing individual codes and the latter listing the individuals.

Referring to the transaction information 108, information for processing new rep codes 220 is delivered through path 222 with the new rep codes being delivered to rep code table 200 by path 224, to table 204 by path 226 and by path 230 to person table 210.

The transactions, which may typically involve, for example, mutual fund sales, mutual fund redemptions, mutual fund repurchases or exchanges, are processed in the process transaction unit 240 which receives transaction information 108 by path 242. The processed transactions are delivered to transaction table 246 by path 250.

The wire order accounts 112 (FIG. 2c), receives by path 114, information representing pending transactions which have not reached the settlement date. In the event that they are not cancelled, they will eventually become transactions. The process station for new rep codes 260 receives the information needed by path 262 and distributes the new rep codes, respectively, to tables 200, 204, 210 by paths 270, 272, 274, respectively. If the rep code is pre-existing, a comparison with the existing tables 200, 204, 210 will confirm this. If not, the rep codes will be added to the tables 200, 204, 210. The processing of wire orders 280 with information transmitted by path 282 involves a comparison to determine whether the order exists and whether the information is an update, in which case, an appropriate change would be made. If it is a new order, it would be entered.

One of the objectives of the present invention is to provide user friendly, readily accessible means for a large number of users to obtain desired investment information, such as investment sales and asset records, while permitting enhanced flexibility with a number of parameters. In order to maintain a user friendly system, it is preferred that the input from the user be provided in response to labeled queries on the user screen and that a dynamic screen be employed to present the requested information to the user so as to eliminate those items which are not being employed.

Figure 3:
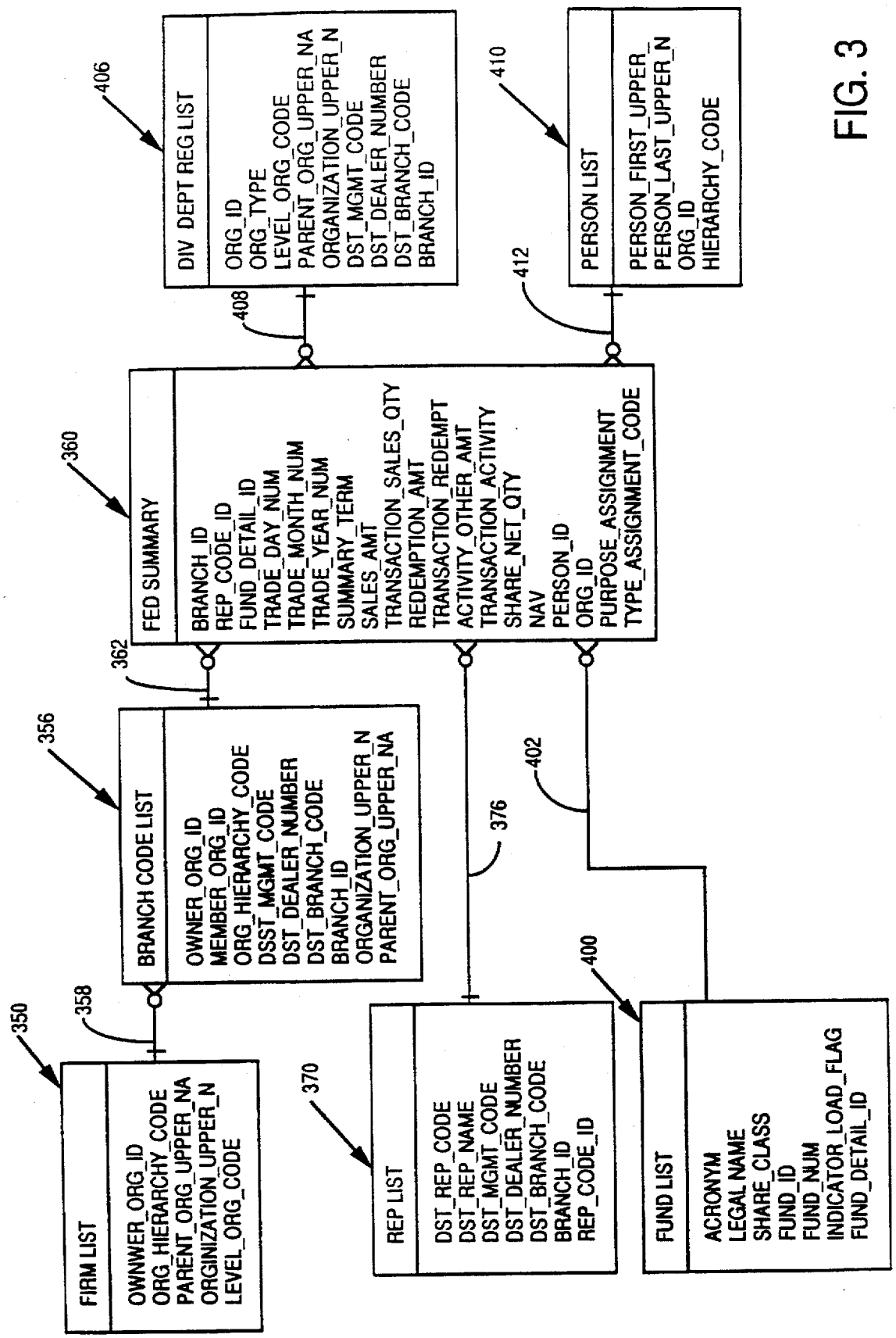
FIG. 3 illustrates an example of a form of information tables for access to the formatted data.

Referring to FIG. 3, examples of information containing list tables which contain the third data as stored in the computer data storage means, will be considered. The logic means within the computer means will not only process the third data, but will also provide it to the appropriate list tables for user retrieval. Retrieval from the list tables will be determined by the logic means in a manner to be described hereinafter.

As will be apparent in respect of FIG. 3, in general, the user will be entering data by selecting item from illustrated sales list tables for Federated. Similar list tables would be provided for asset information.

The arrangement of FIG. 3 is related to the user seeking sales information in the Federated portion of the computer as distinguished from data obtained with respect to other clients. Each screen category has corresponding entries in a table in FIG. 3. The user's election of one of the three options for each screen displayed fields will cause the computer logic means to join certain list tables and select data within certain fields within such tables in order to provide the user with the requested information on the user interface screen. The user, therefore, by making the elections causes the logic means to join the data containing tables and select appropriate fields therewithin. In the representation shown in FIG. 3, the list tables are shown as rectangles and the fields contained therein are identified by words. Paths connecting the tables are shown as lines with a vertical cross line indicating that for every single field in the adjacent box, the other box having a circle adjacent to a triangle may have zero or any number of responsive fields connected. The list tables of FIG. 3 are static in nature with the summary table 360 being the principal list table. The logic means in the computer responsive to user elections selects the sales data from the list tables to be presented to the user on the screen (or to otherwise be provided as by hard copy or storage within the computer or on other magnetic storage media). In response to the user election, the logic means will determine what list tables and what portions thereof will be employed in providing a response to a user regarding a user election as to a field.

In the sales example provided in FIG. 3, the initial user response will be to enter the time period of interest with an indication of the beginning date and end date for the inquiry which must be between the beginning and end dates of the available data. The list tables are shown in a particular joined relationship. Firm list table 350 is joined to branch code list table 356, as shown by line 358, and branch code list table is shown joined to Federated summary table 360 by line 362. Similarly, representative list table 370, fund list table 400, division-department-region list table 406, and person list table 410 are shown joined to Federated summary table 360, respectively, by lines 376, 402, 408 and 412.

In assuming there is no information regarding the firm or branch code, one may enter the fed summary 360 through the table 370 which provides a list of representatives. This information is directed toward fed summary table 360 by path 372.

In a manner to be described in detail hereinafter, in connection with FIGS. 4a–4k, the responses provided by the user, through the user interface, will direct the computer logic system to responsive action to provide from the third data the desired sales or asset information to the user. Such information processing may involve joinder of information tables such as exemplified by FIG. 3. The computer means also, as new processed third data becomes available, updates the attributes contained in the list tables.

It is preferred that the user be provided with flexibility in designating the parameters which determine what third data will be referenced. Within the fed summary 360, the information regarding branch I.D. obtained from table 356, fund detail obtained from table 400, the begin and end trading dates and summary term, are provided. The amounts of sales activity within particular categories are determined and information regarding the person or organization respectively from tables 410, 406 may be provided to the user on-line. In a preferred embodiment, all third data involving monetary amounts will be contained in the Federated summary list table.

There may be instances where a firm name from firm table 350 produces a number of branch ID's. It then may be unnecessary to create a join based upon the information entered.

The information obtained will be keyed to the date or time period for which the request has been entered by the user.

It will be appreciated that the first data as originally introduced into the computer means is modified by second data received from transfer agent 100 (FIG. 2) which is assimilated, formatted, and may be otherwise processed into third data which is stored in list tables such as those shown in FIG. 3. Different list tables and table arrangements than those shown in FIG. 3 may be employed depending on system content and purpose. These tables are in the front end of the user interface and are retrievable in accordance with the computer logic responsive to the user electing to obtain as to any screen field (a) restricted information (first option), or (b) all information in a field (second option ), or (c) summary information (third option). While for simplicity of disclosure, the third option as described herein will be the default option, the system may be programmed to make the second option the default option, if desired.

To provide an enhanced understanding regarding the processing of information introduced in accordance with FIG. 2 and the attribute containing list tables of FIG. 3, the front end user interface detailed information regarding options in the sales screen logic (FIGS. 4a–4k) and asset screen logic (FIG. 5) will be provided.

FIGS. 4a–4k form a single flow chart when matching letters are aligned. FIGS. 4a–4k shows the handling of sales information so as to provide the basic first data as modified by the assimilated and reformatted input second data, shown in FIGS. 2a–2c, to permit selection, processing and delivery of the resultant third data to the user by way of the logic means controlled list tables of FIG. 3, for example. The sales screen logic 500, which interacts with the user interface, is indicated generally by the reference number 500. The underlying informational processing structure is shown schematically as connected to sales screen logic 500 by the appropriate lines. The sequence of addressing these logic components will preferably be from left to right as considered in the assembled FIGS. 4a–4k. In the left-hand portion of the logic diagram, reference number 502 shows the Federated screen which relates to the portion of the logic keyed to transactions involving Federated as a mutual fund complex having a plurality of mutual funds. If any data is filled in this portion of the screen, such as 504, the CRT would display information from Federated summary 506 which is indicated as the table 360 in FIG. 3. If, however, no data is filled in, as indicated by the condition 510, the summary table designated DST summary (not shown) which contains attributes for activities of other sales entities or individuals.

The logic means for delivering the information to the user interface responsive to user input in the labeled fields will be organized so as to provide conditions precedent to accessing particular portions of the logic. In a preferred practice of the invention, as to any labeled fields permitting user input, there will preferably be three options. For example, if a field calls for identification of a mutual fund, a first option would be to have the user enter a specific response, such as "XYZ." In such case, only sales or asset information for that specific fund would be provided by the logic means from the third data in the list tables of FIG. 3. Such information may be further refined by responses provided by the user to other labeled fields. For convenience of reference, the first option, which requests specific information, will be referred to herein as "NOT ALL." In a second option, the user might desire sales information on all of the funds and would respond to the query by inserting "ALL." Sales information with respect to each fund in the computer would then be displayed subject to whatever restrictions might be imposed by user responses to other labeled fields. The third option the user has is to leave "fund" blank wherein, subject to the answers to the other labeled fields, a total or summary of sales for all of the funds would be provided, but unlike "ALL," there would not be an individual listing of each fund and its sales. It will be appreciated that with the plurality of labeled fields within which the user may enter information thereby electing the first or second options or, by default, electing the third option, this results in the logic selectively accessing the information contained in list tables and providing a real-time screen display of the same in a manner customized to the user's labeled field option elections.

Once selection of the appropriate company summary list table is made under block 502, the summary term field 520 is displayed on the screen giving the user options "M" 522, "R" 524, "D" 526, "P" 528. This election relates to the user desiring daily or monthly information. If the M block 522 is selected, this is an "ALL" entry by the user. The system will access summary list table rows where the summary is equal to M (Monthly) as in block 528 and will generate a code to group the summary table trade month and year number 530. If "R" is selected, this is the equivalent of user making no selection, i.e., blank by the user (block 524), this will access summary table rows where summary term is equal to M 534. If block D 526 is selected, the system will access summary table rows where the summary term is equal to D (Daily), as in block 540, and generate code to group the summary table, wherein the trade day, month and year number 542 is employed. If block P 528 is selected, this is equivalent to a blank response. The system will access summary table rows wherein summary term equals D, i.e., daily (block 550). The user must make an election in the summary term field.

Next the user has entered a date or dates in the date field. Referring to block 554, the user has inserted a begin date field, thereby not leaving it blank (block 556). The logic means will generate a code to select rows where the summary table trade date is greater than or equal to the period begin date (block 558). If the period end date 560 is not blank 562, the system will generate a code to select rows where the summary table trade date is less than or equal to the period end date 564.

At this point in selecting data for delivery to the user, the selection of Federated or not 502, the summary term field 520 and the period dates 554, 560 have been considered sequentially.

Figure 4A:
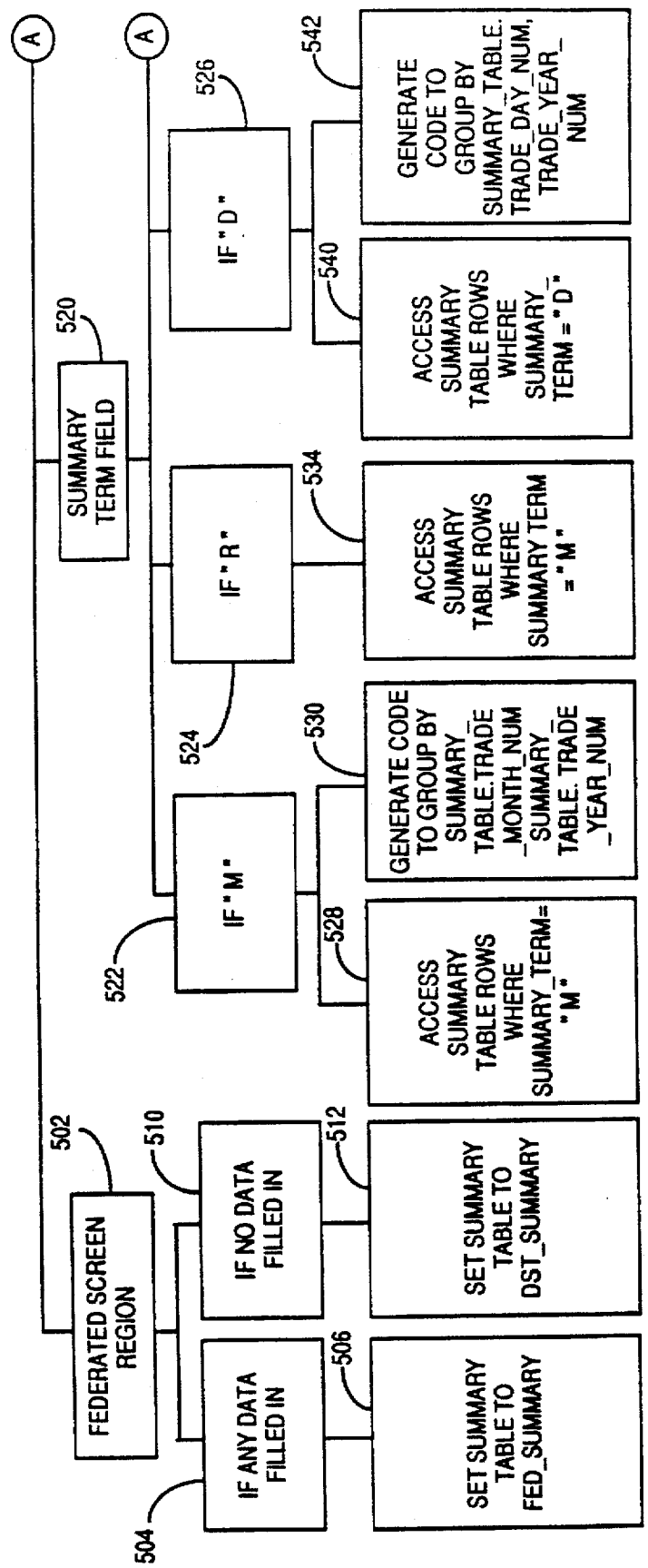
FIGS. 4a through 4k, when assembled, are a logic diagram showing a preferred approach to use of the present system in respect of sales information.
Figure 4B:
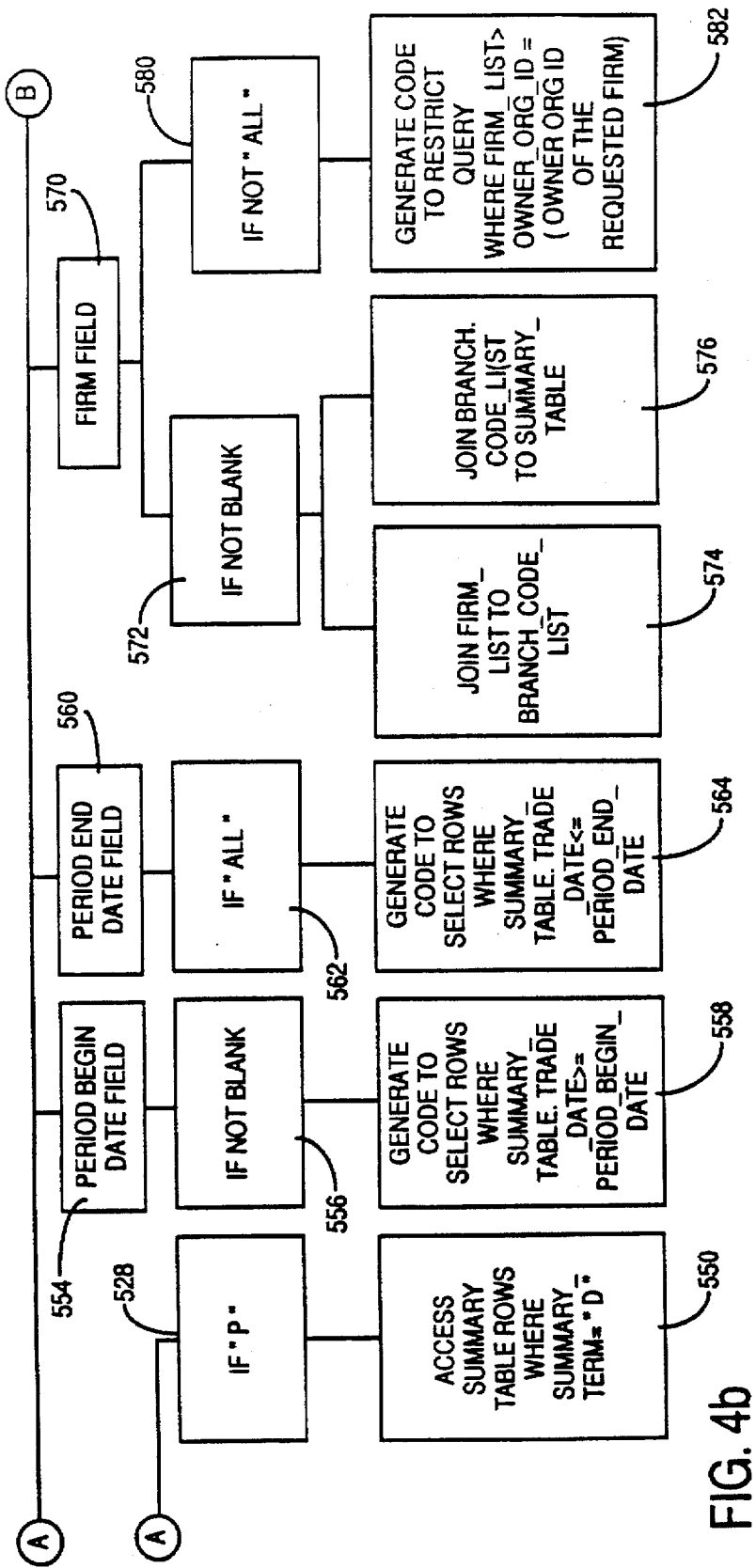

The firm field block 570 in FIG. 4b, if not left blank by the user in accordance with block 572, will cause the firm list table 350 (FIG. 3) to be joined by the logic means to the branch code list table 356 (FIG. 3) in accordance with block 574 and will join the branch code list table 356 to the Fed summary list table 576 (table 360 in FIG. 3).

With respect to the firm field 570 and all subsequent fields in FIGS. 4a–4k, every field on the screen, there are two possible positive entries, i.e., options. In the first option, there is a restriction based upon field, but it is not necessary to restrict the text translation in the resultant CRT screen observed by the end user. If there are "ALL" events, i.e., the second option, there is no restriction based on the field, but there is the need to join in the text translation of the field. In block 580 in the firm field, if it is not "ALL," there is a code generating block 582 to restrict the query where firm list owner organization identification equals owner organization identification of the requested firm.

Figure 4C:
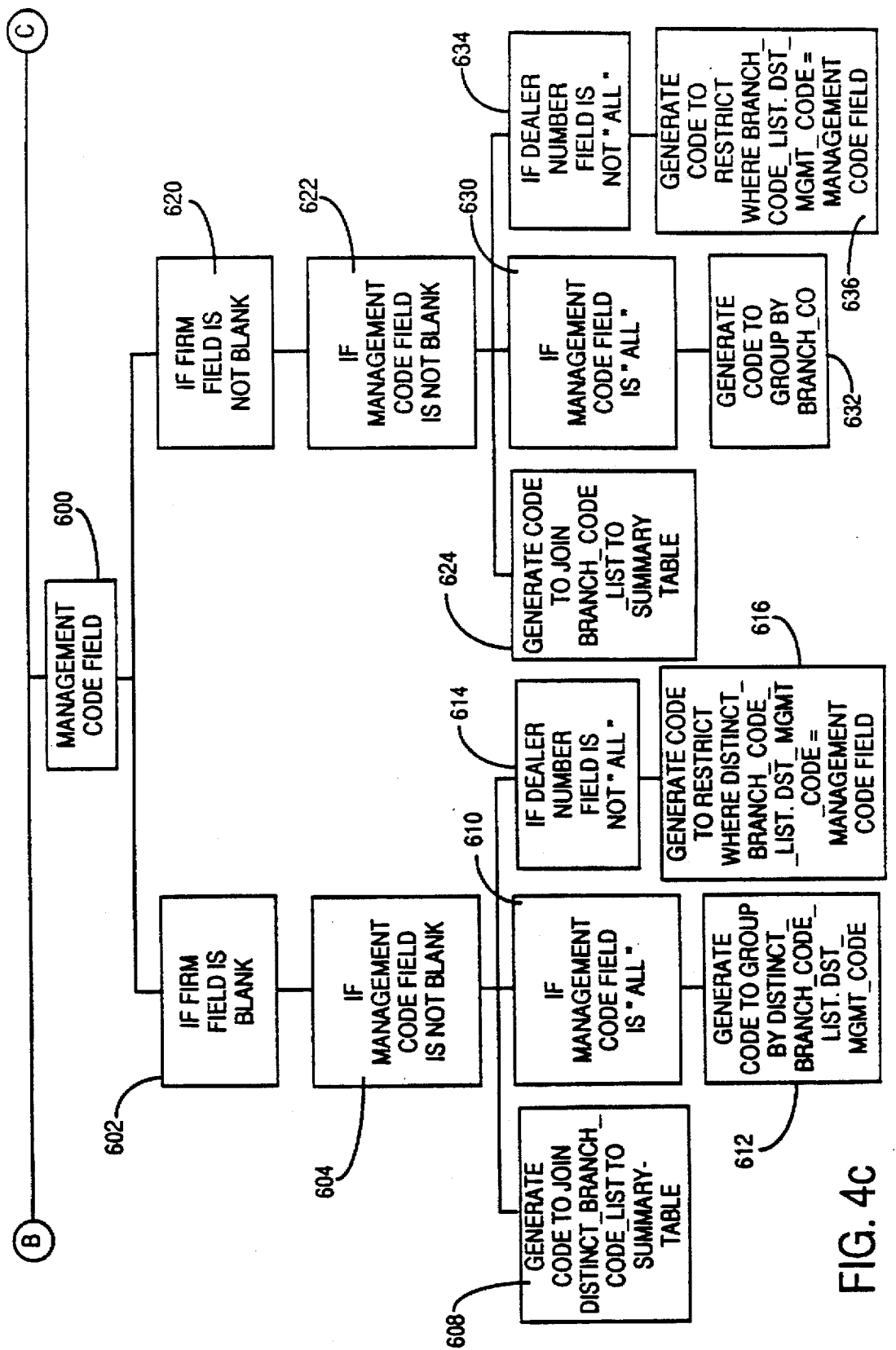

Looking next in sequence at the management code field 600 in FIG. 4c, if the firm field 570 is left blank and the management code field is not blank 604, this means that no firm has been inserted in firm field 570, but a management code which could be a number, for example, has been inserted.

The absence of a blank in management code field 604 generates several logic means driven activities. A code to join distinct branch code list 356 to the summary table 608 (360 in FIG. 3) is employed. If the management code field is "ALL" 610, then there is also generated a code to group by distinct branch code list dst management code. The expression "dst" refers to sales made through a third party organization, i.e., dst rather than sales made by a Federated employee. If the dealer number field is not "ALL" 614, then there is also generated a code to restrict where distinct branch code list dst management code equals management code field 616.

If the firm field is not blank 620 and, if the management code field is not blank 622, two options can occur. There is generated by the logic means a code to join branch code list table 356 to summary list table 624 (360 in FIG. 3). If the management code field is "ALL" 630, a code is generated to group by branch company 632. If the dealer number field is not "ALL" 634, there is generated a code to restrict where branch code list dst mgmt code equals management code field 636.

Figure 4D:
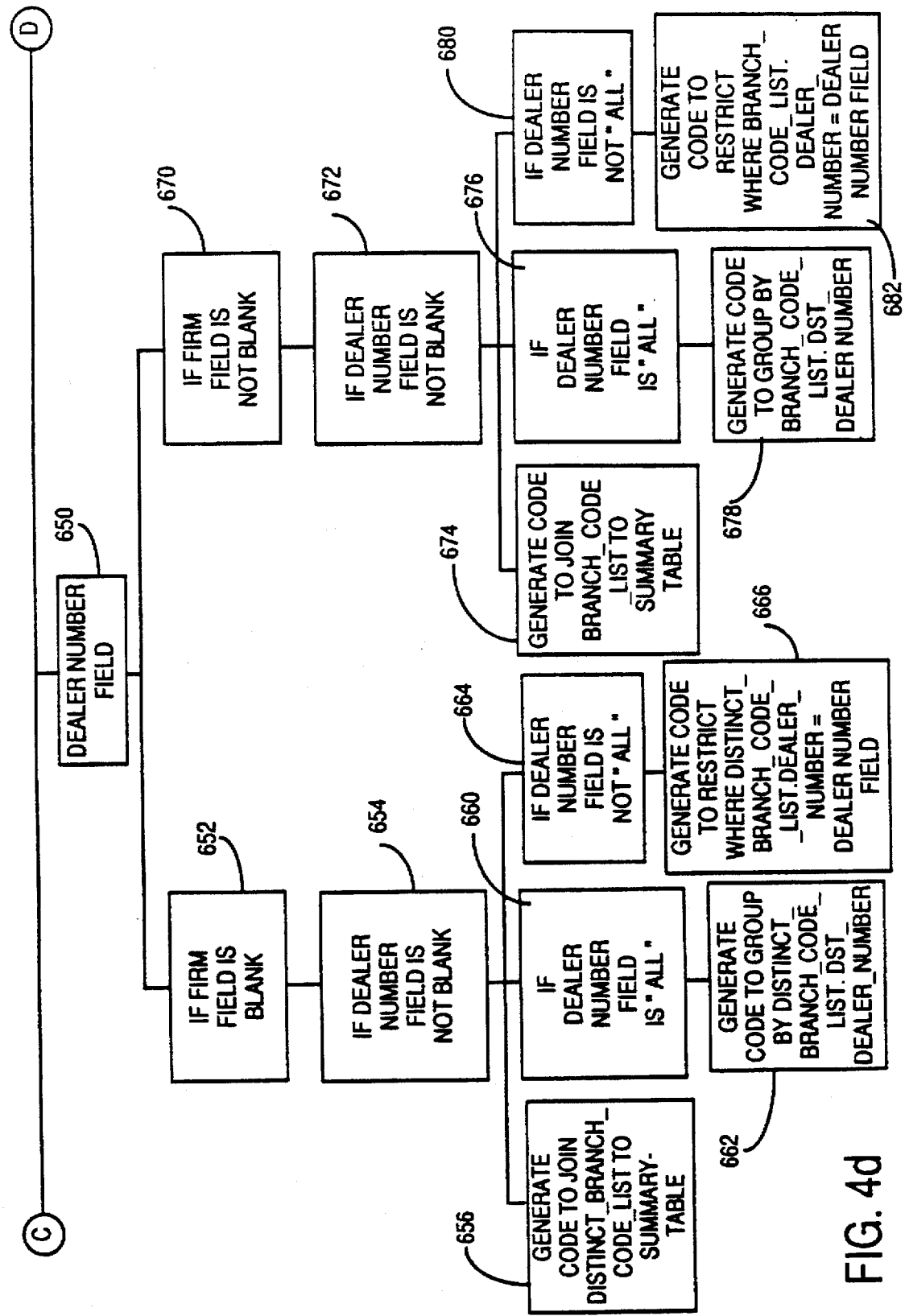

Next in sequence is the dealer number field 650 in FIG. 4d. If the firm field 570 has been left blank 652 and the dealer number field is not blank block 654, a code is generated to join distinct branch code list to summary table 656 (360 in FIG. 3). If the dealer number field is "ALL" 660, a code is generated to group by distinct branch code list dst dealer number 662. If the dealer number field is not "ALL" 664, a code is generated to restrict to where distinct branch code list dealer number equals dealer number field 666. If the firm field is not blank 670 and the dealer number field is not blank 672, a code is generated to join branch code list to summary table 674. If the dealer number field is "ALL" 676, a code is also generated to group by branch code list dst dealer number 678. If the dealer number field is not "ALL" 680, a code is generated to restrict where branch code list dealer number equal dealer number field 682.

It will be appreciated that in the preferred sequence of retrieving data, the status of the firm field 570 is determined and subsequently the management code field 600 and dealer number field 650 (as well as branch code field 700 and rep code field 750) are determined. Dependent on the status of the firm field 570, the subsequent specific fields 600, 650, 700, 750, in respect of logic branch employed, is determined. As a result, the user response to both the first field and the specific second field are interrelated. Also, the summary list table use in the default or third option also is present if the first or second options are elected. The summary information is, therefore, in the preferred embodiment, present without either the first option specific third data or the second option all data election if a default or third option is selected by the user and is also present with additional information when the first or second option is selected.

Figure 4E:
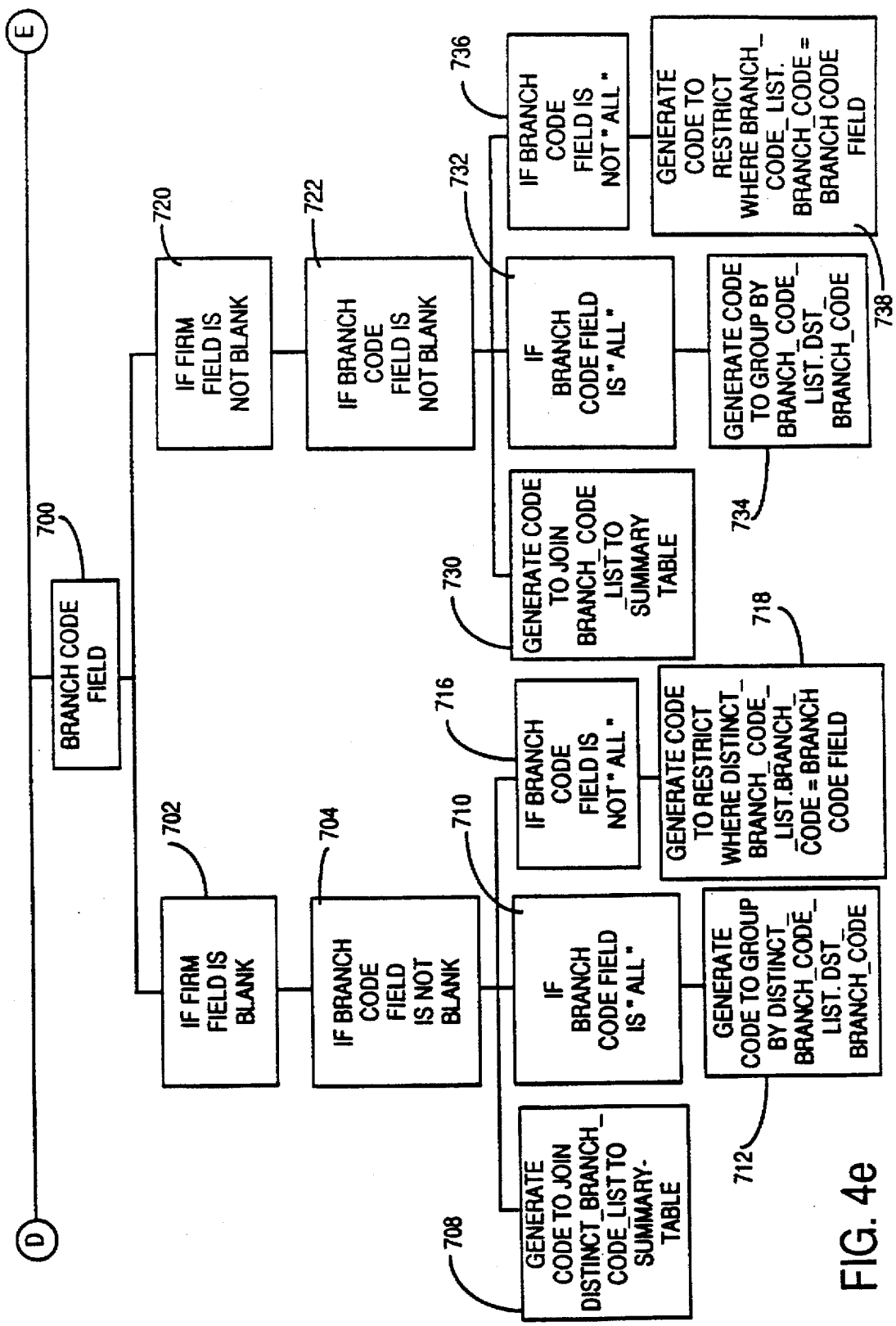

Referring to the branch code field 700 in FIG. 4e, if the firm field 570 has been left blank by the user (block 702), and the dealer number field is not blank (block 704), there is generated a code to join distinct branch code list table to summary list table 708. If the branch code field is "ALL" 710, a code is generated to group by distinct branch code list dst branch code 712 (throughout "dst" will indicate the sales sources other than Federated). If the branch code field is not "ALL" 716, a code is generated to restrict where distinct branch code list branch code equals branch code field 718.

If the firm field 570 is not blank 720 and the branch code field is not blank 722, a code is generated to join branch code list to summary table 730. If the branch code field is "ALL" 732, a code is generated to group by branch code list dst branch code 734. If the branch code field is not "ALL" 736, a code is generated to restrict for branch code list branch code equals branch code field 738.

Figure 4F:
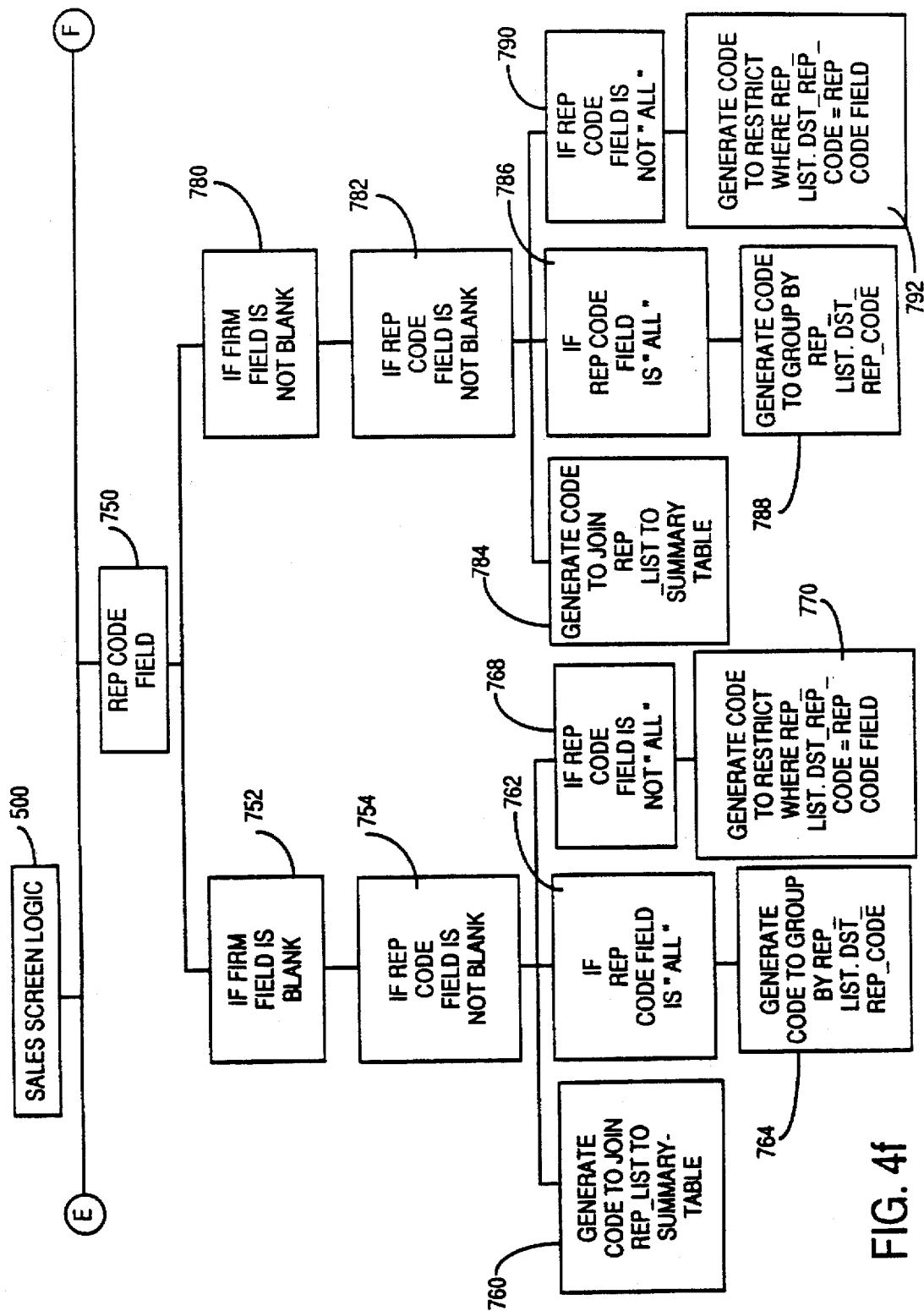

Turning to the next segment, with reference to FIG. 4f, the rep code field 750, if the firm field is blank 752 and the rep code field is not blank 754, a code is generated to join rep list table (370 in FIG. 3) to summary list table 760 (360 in FIG. 3). If the rep code field is "ALL" 762, a code is generated to group by rep list dst rep code 764. If the rep code field is not "ALL" 768, a code is generated to restrict where rep list dst rep code equals rep code field 770. Block 768, therefore, represents the user having elected the specific first option and block 762 represents the user having selected the second option. If the firm field is not blank 780 and the rep code field is not blank 782, a code is generated to join rep list to summary table 784.

If the rep code field is "ALL" 786, a code is generated to group by rep list dst rep code 788. If the rep code field is not "ALL" 790, a code is generated to restrict where rep list dst rep code equals rep code field 792.

Figure 4G:
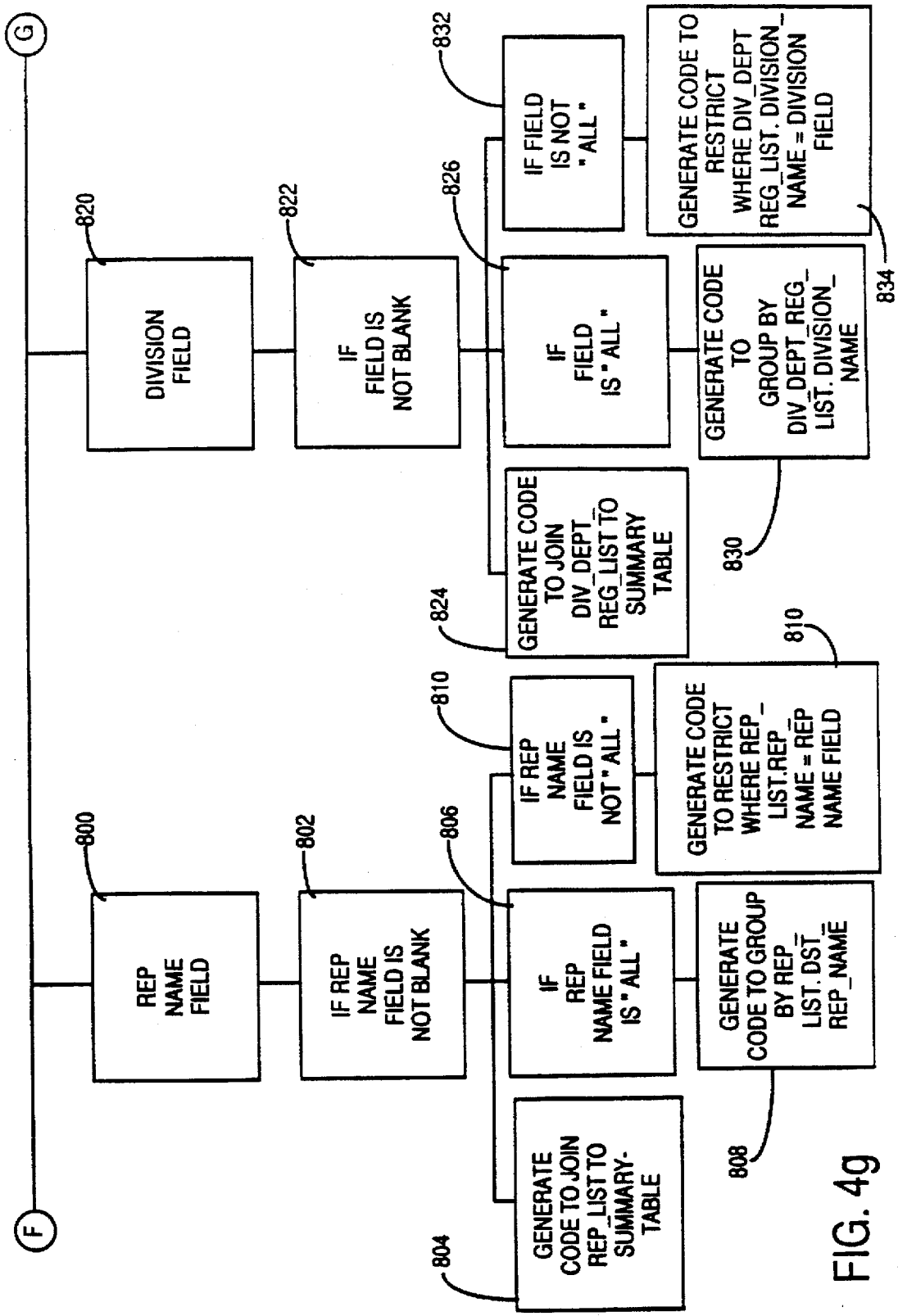
Figure 4H:
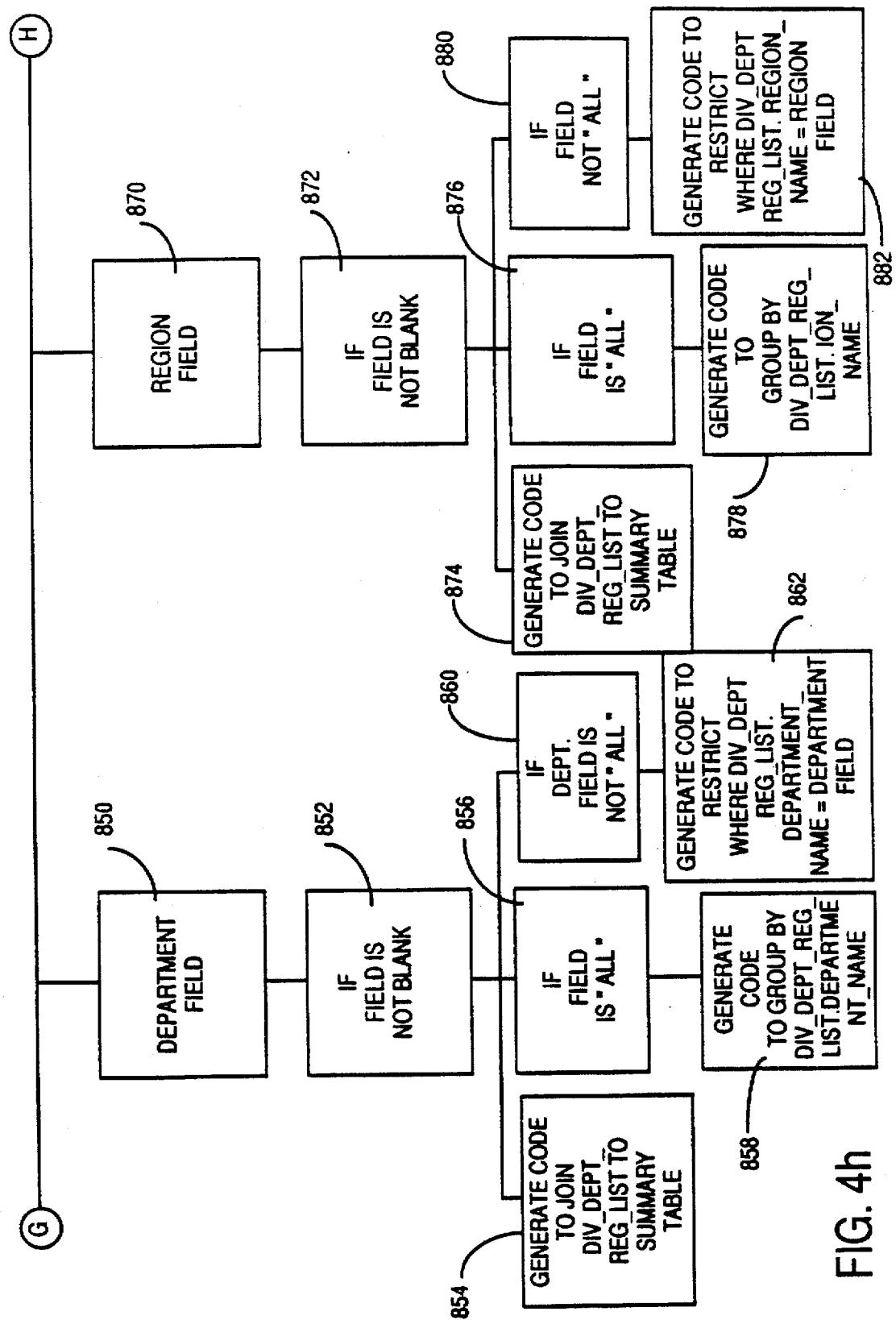
Figure 4I:
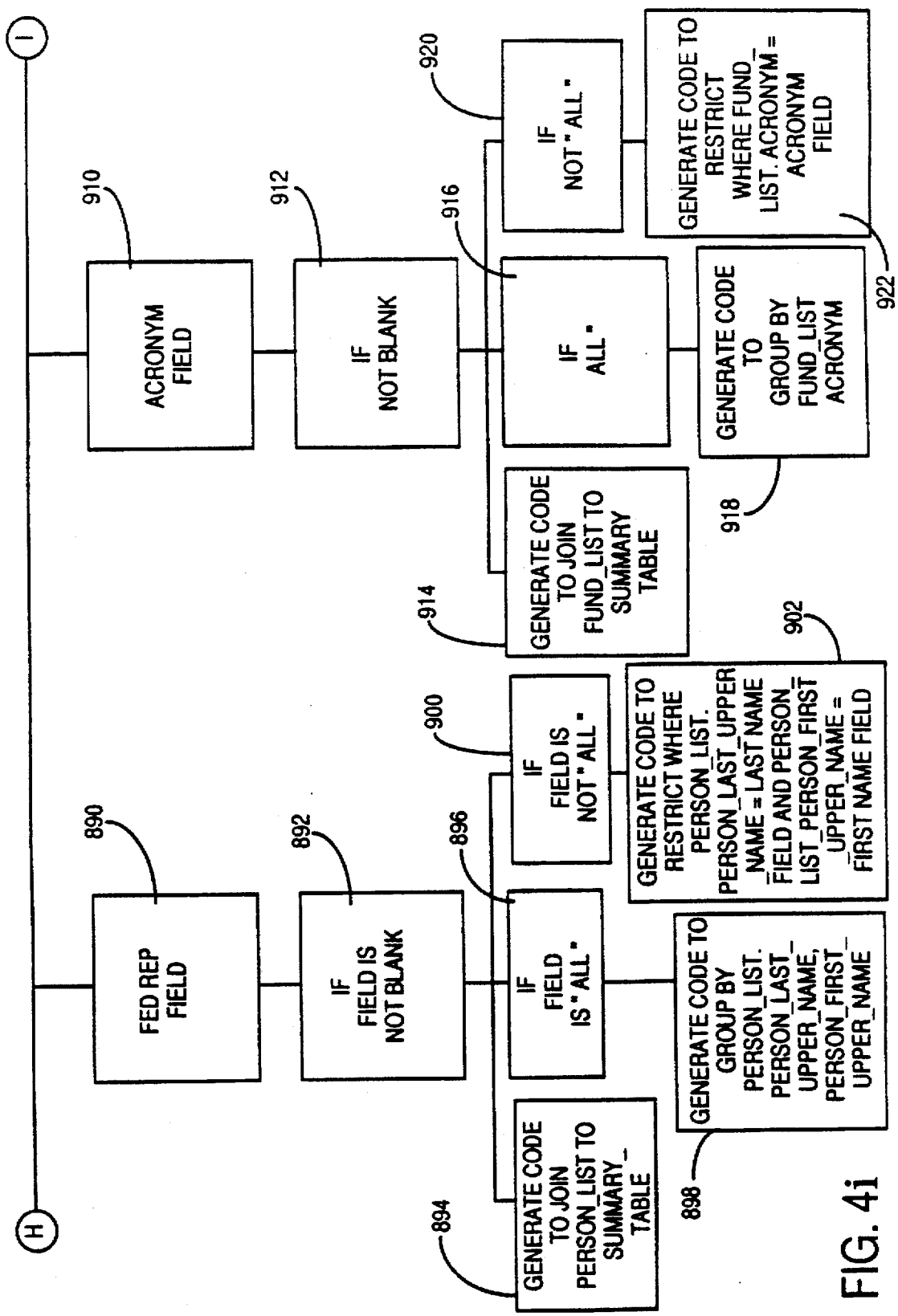
Figure 4J:
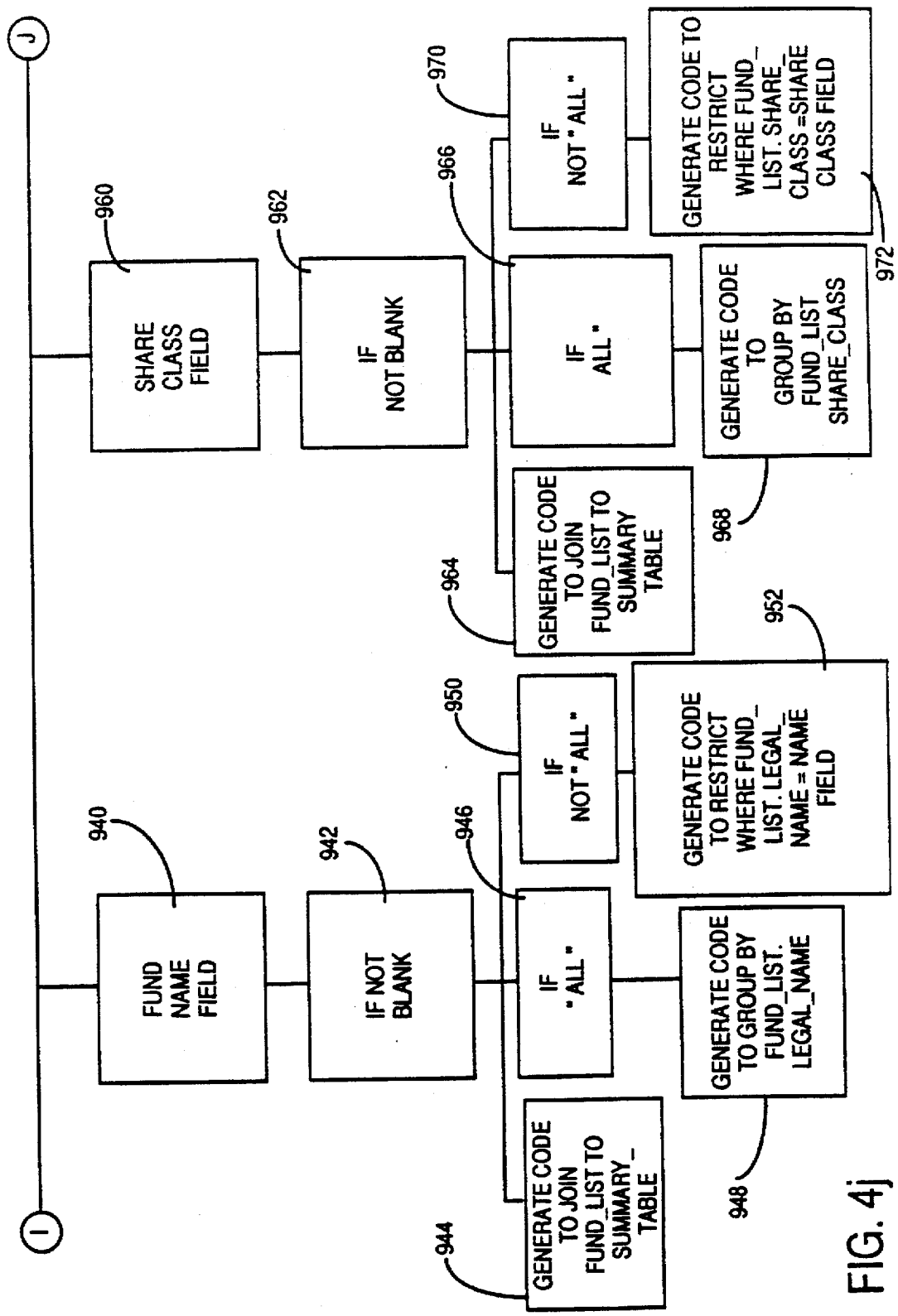
Figure 4K:
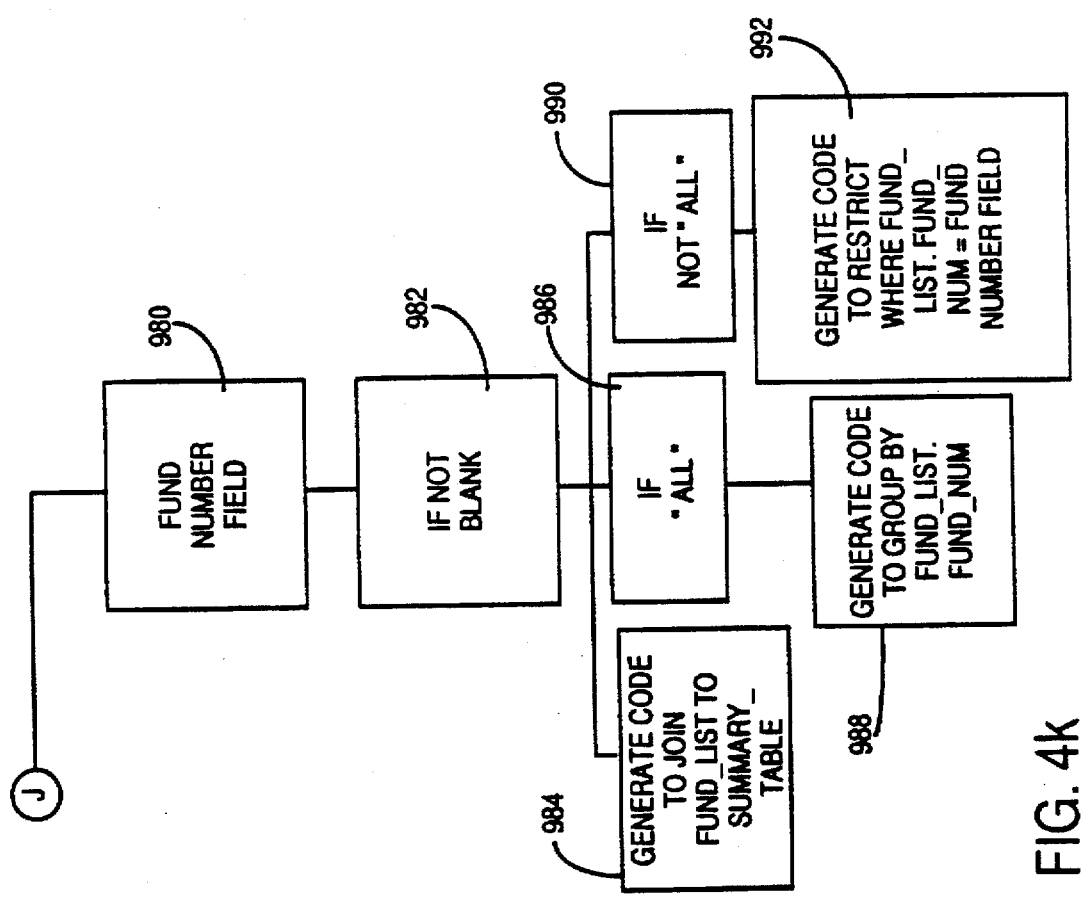

Continuing sequentially through the fields, rep name field 800, as shown in FIG. 4g. if the rep name field is not blank 802, a code is generated to join rep list to summary table 804. If the rep name field is "ALL" 806, a code is generated to group by rep list dst rep name 808. If the rep name field is not "ALL" 810, a code is generated to restrict where rep list at rep name equals rep name field 810. Similarly, with respect to division field 820 (FIG. 4g), if the division field is not blank 822, a code is generated to join div dept reg list to summary table 824. If the division field is "ALL" 826, a code is generated to group by div dept region list div name 830. If the division field is not "ALL" 832, a code is generated to restrict where div dept reg list div name equal division field 834.

With respect to the department field 850 (FIG. 4h), if the field is not blank 852, a code is generated to join div dept reg list to summary list table 854. If the department field is "ALL" 856, a code is generated to group by div dept reg list dept name 858. If the department field is not "ALL" 860, a code is generated to restrict where div dept reg list dept name equals department field 862.

With respect to the region field 870 (FIG. 4h), if the region field is not blank 872, a code is generated to join division department region list to summary table 874. If the field is "ALL" 876, a code is generated to group by div dept reg list region name 878. If the field is not "ALL" 880, a code is generated to restrict where div dept reg list region name equals region field 882.

The fed rep field 890 (FIG. 4I), if the fed rep field is not blank 892, a code is generated to join person list table to summary list table 894. If the field is "ALL" 896, a code is generated to group by person list person last upper name, person first upper name 898. If the fed rep field is not "ALL" 900, a code is generated to restrict where person list person last upper name equal last name field and person list person first upper name equals first name field 902.

In the acronym field 910, which permits fund identification by an abbreviated term, if not left blank 912, a code is generated to join fund list table (400 in FIG. 3) to summary list table 914 (360 in FIG. 3). If "ALL" 916, a code is generated to group by fund list acronym 918. If not "ALL" 920, a code is generated to restrict where fund list acronym equals acronym field.

If the fund name field 940 (FIG. 4J) is not blank 942, a code is generated to join fund list to summary table 944. If the fund name field is "ALL" 946, a code is generated to group by fund list legal name 948. If the field is not "ALL" 950, a code is generated to restrict where fund list legal name equals name field 952.

In the share class field 960, if it is not blank 962, a code is generated to join fund list to summary table. If the field is "ALL" 966, a code is generated to group by fund list share class. If the field is not "ALL" 970, a code is generated to restrict where fund list share class equals share class field.

In the fund number field 980 (FIG. 4k), if it is not blank 982, a code is generated to join fund list to summary table 984. If the field is "ALL" 986, a code is generated to group by fund list fund number. If the fund number field is not "ALL" 990, a code will be generated to restrict where fund list fund number equals fund number field 992.

It will be appreciated that in the example regarding sales information disclosed with respect to FIGS. 4a–4k, that the user in response to each labeled field on the screen will elect one of three options. Option one will be to insert a specific answer, such as fund "XYZ" and receive sales information on this fund. Option two is to insert "ALL," in which case, rather than presenting sales information for "XYZ," it will provide sales information for all of the funds in the system. If desired, the user may create subgroups containing more than one fund, but less than all. (Such groups shall be deemed to be "ALL" for purposes of this disclosure.) In the first two options, the user will select the fields or field in addition to the fund with respect to which sales data will be displayed. The third option would be to leave a field blank, in which case a summary of total sales would be provided without the backup information. Such total sales would also be provided with the first or second options. The user responses will be processed by the logic of FIGS. 4a through 4k to provide the requested information on the screen in spreadsheet, columns, or whatever format has been selected by the user. The labeled fields of the user interface screen correspond with the logic fields and the logic fields are preferably processed in the sequence shown in FIGS. 4a–4k. As the user exercises one of the three options for each labeled field, the third data assembled and displayed will represent the intersection of the parameters.

It will be appreciated, therefore, that with the detailed example of FIGS. 4a–4k which is directed primarily toward retrieving the sorted, formatted or otherwise processed information input as shown in FIG. 2, permit the user to, in a rapid fashion, employ the preferred approach to retrieving third data from list tables of FIG. 3. Such third data, with respect to sales, may include information regarding the time period of interest, the dealer information, account information, transaction information and wire order information which produce changes in the basic data, as well as the logic supporting the user screen which is employed in a response to labeled fields, preferably, with a dynamic screen presenting the selected data in the desired format. Huge numbers of information units, which may be in excess of 10,000 per 24 hour period and may be on the order of millions per day, may be rapidly integrated in the system for user friendly retrieval in any desired manner.

It will be appreciated that the computer logic means have at least two fields and, preferably, at least six fields selected from the group consisting of firm field, management code field, dealer number field, branch code field, representative code field, representative name field, division field, department field, region field, representative field, acronym field, fund name field, share class field and fund number field.

It will be appreciated by those skilled in the art that the present invention may readily be practiced by programming a general purpose digital computer to configure the computer to perform the disclosed functions in the disclosed ways. In the alternative, if desired, all or portions of the functions may be performed by hardware components in lieu of the software.

It is contemplated that this system will provide a means for updating large volumes of transactions in a rapid manner so as to permit a user to introduce the desired parameters in terms of date or starting and end dates of interest, the particular dealer or organization involved in the transactions, the fund or other investment, asset information the nature of particular transactions, such as sales, purchases and redemptions and obtain responsive information.

Figure 5:
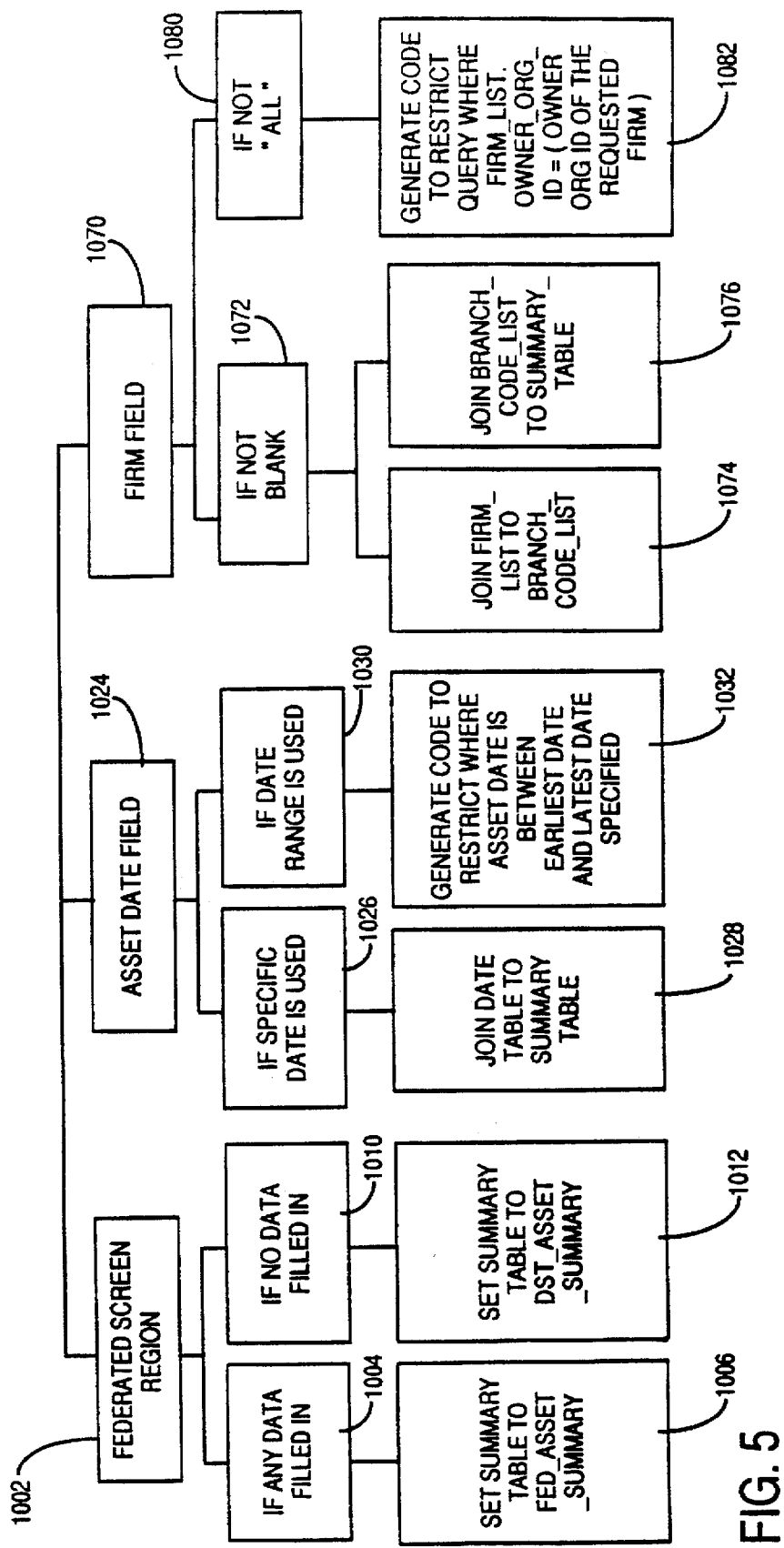
FIG. 5 is a portion of a logic diagram showing a preferred use of the present system in respect of asset processing in accordance with the present invention.

Referring to FIG. 5, which will provide the asset screen logic wherein the inquiry is not so much sales and marketing oriented, but rather is directed toward asset information. The figure in the preferred form, is essentially the same as FIGS. 4a–4k accept that in lieu of sales screen logic block 500, an asset screen logic block (not shown) would be substituted at that location. In addition, the blocks designated 520 summary term field through 564 would be deleted and an asset data field 1024 would be inserted. Otherwise, the two figures can be substantially identical.

Referring in greater detail to FIG. 5, if the Federated screen region 1002 has an "if any data filled in" 1004, the code sets the summary table to fed asset summary 1006. If no data is filled in 1010, the set summary table to Federated data with respect to dst asset summary 1012 is employed. This merely, as in the sales case, tells the computer that either Federated's records or DST's will be accessed.

The asset data field 1024 has one option which is a specific date 1026 which, if elected, results in joining the date table to the summary table 1028. The other option is for a date range 1030 which generates a code to restrict where asset date is between the earliest date and latest date specified 1032.

The firm field 1070 may be essentially the same as firm field 570 of FIG. 4b. The if not blank block 1072 branch leads to a join firm list to branch code list table 1074 and joining branch code list to summary list table 1076. The if not "ALL" 1080 block generates code to restrict query where firm list owner org id equals owner org id of the requested firm 1082. Similar portions of the logic to the components of FIGS. 4a–k and associated logic trees will also, in this context, relate to management code field 600, dealer number 650, branch code field 700, rep code field 750, rep name field 800, division field 820, department field 850, region field 870, fed rep field 890, acronym field 910, fund name field 940, share class field 960 and fund number field 980. A group of list tables generally similar to the sales list tables of FIG. 3, but directed toward asset information would be employed in this embodiment.

Figure 6:
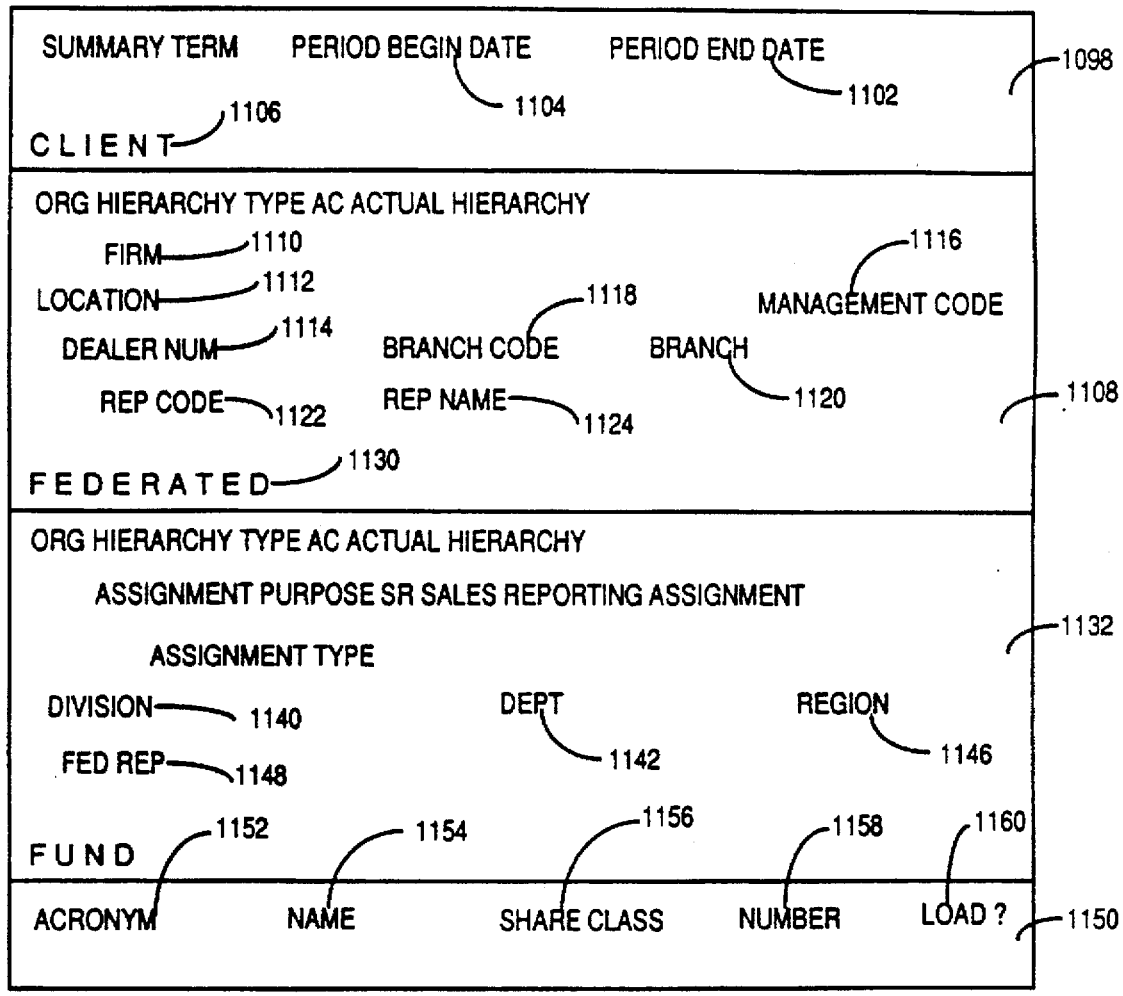
FIG. 6 is an example of a user interface screen employable with a sales information embodiment of the invention.

FIG. 6 is a user interface screen adapted to be employed in the present invention with respect to obtaining sales information. In order to make the system user friendly, the invention contemplates user insertions in labeled fields as the way of establishing the parameters which the user desires to be employed in retrieving the third data from the computer storage means.

It is understood that the user may, if he or she desires, employ the default or blank option with every labeled fields, but such action will generally not be employed as more specific parameters will be employed in at least some fields. Also, if desired, logic functions may be employed in the user interface to establish certain triggers which limit the user's freedom. In this regard, such triggers may be embedded in the software component of the screen. For example, if a management code 1116, which did not exist, were entered, the screen would display a message advising the user of the error.

Initially, in block 1098, the user is requested to insert the period begin date 1104 and the period end date 1102 with identification of the client 1106 or Federated 1130.

The next portion of the screen, which is in block 1108, deals with identification of the brokerage firm or dealer, or representative involved in handling the transaction. The user will select from the sequence that information which he or she desires to obtain by employing one of the three options as to each field. Fields are provided for insertion of firm identification 1110, location of the firm 1112, the dealer number 1114, the management code 1116, the branch code 1118, the branch 1120, the rep code 1122 and the rep name 1124. If rather than being an outside client 1106, the client is the company operating the system, such as Federated, this information is provided at 1130. Within Federated, in block 1132, there is provided hierarchical information regarding the assignment of the sales for purposes of getting credit for the sales and commission payment. As stated hereinbefore, the hierarchical approach to assignment provides a listing in descending order of specificity wherein finding an entry at one level eliminates the need to go to the next level. This hierarchical analysis is performed by the computer logic means with only the specific answer being provided on the screen. Within the Federated block 1132, the fields include division 1140, department 1142, region 1146 and Federated representative 1148.

Within rectangle 1150, information regarding identification of the particular mutual fund is provided as by acronym 1152, formal mutual fund name 1154, share class 1156, number of shares 1158 and whether it is a load or no load fund 1160. By exercising one of the three options as to each field of inquiry, the user tells the computer logic means which information the user desires.

Figure 7:
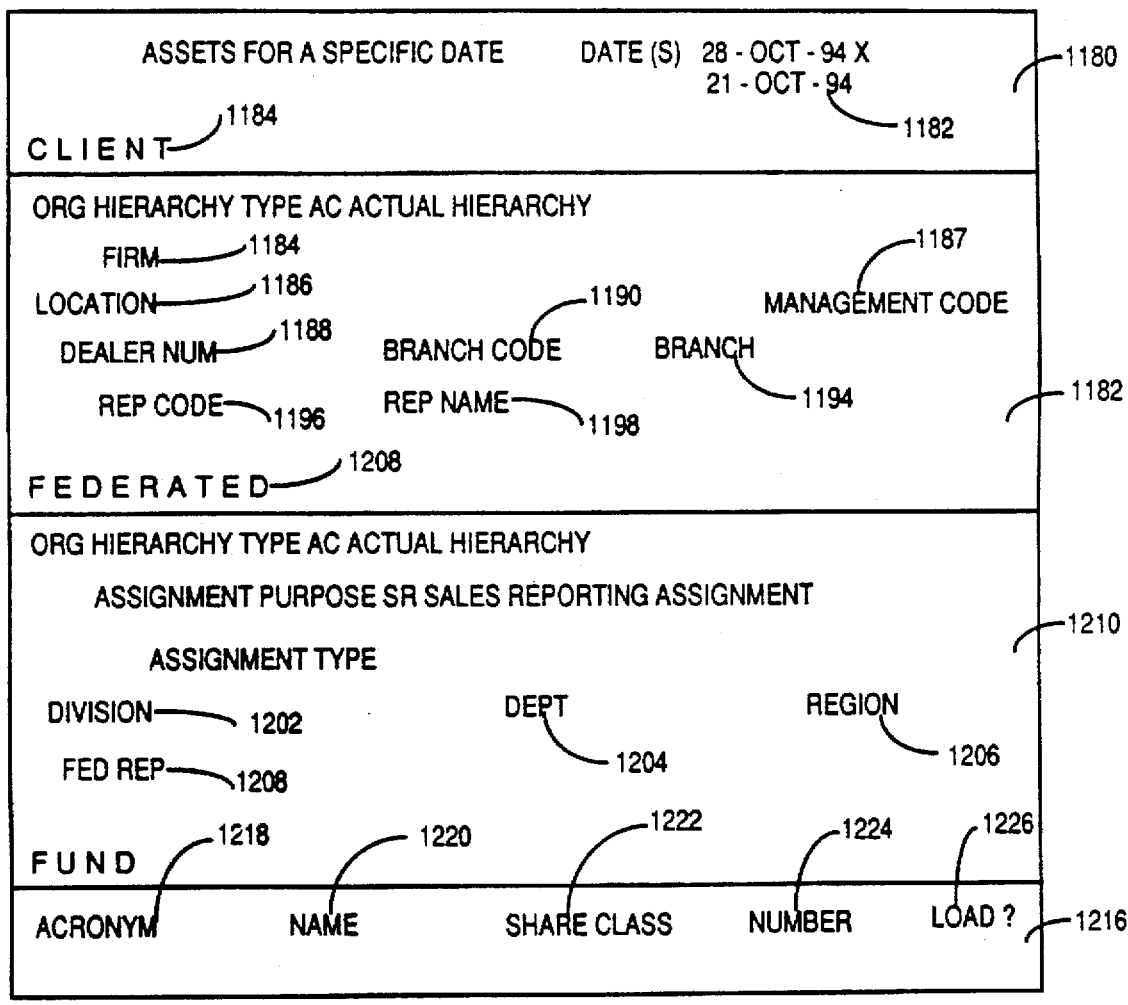
FIG. 7 is an example of a user interface screen employable with an asset information embodiment of the invention.

Referring to FIG. 7, this screen involves use of the system in obtaining asset information for a specific date or a time period, such as shown in rectangle 1180 by reference number 1182. The "X" indicates a date selected. The identity of the client is inserted at 1184 or Federated is selected at 1208. In similar fashion to FIG. 6, the business organization information is provided in rectangle 1182 with firm information being 1185, the location 1186, management code is 1187, dealer number 1188, branch code 1190, branch 1194, representative code 1196, and representative name 1198. Similarly, to the sales information of the screen of FIG. 6, FIG. 7 provides labeled fields for user selection of parameters. To the extent to which it is a Federated transaction, Federated is entered at 1208 with the assignment of asset again being determined in hierarchical fashion. The user will elect one of the three options for each field, i.e., division 1202, department 1204, region 1206, and Federated representative 1208. This all appears in rectangle 1210.

In rectangle 1216 are provided spaces for inserting mutual fund information, such as the acronym 1218, the name of the fund 1220, the share class 1222, the number of shares 1224, and whether it is a load or no load fund 1226.

With reference to FIGS. 6 and 7, it will be appreciated that depending upon the specific use of the system, different fields may be employed while employing the beneficial aspects of the present invention.

Details of a preferred parallel processing system are shown in FIG. 8. It will be appreciated that the logic means has a pre-established hierarchy of levels which are presented in descending order of preference. In order to improve speed of processing, simultaneous or parallel processing will be employed. In essence, each level will seek data at its level and, if found, will deliver the data only if there is no data for a higher level. In this manner, data available for the highest level will be delivered to the exclusion of data from other levels. In a preferred approach, the highest level will be the narrowest or most specific level and it will with increased specificity progress to the lowest level which will be the broadest or most general level.

Another feature of the invention is to employ in certain categories a hierarchical structure which establishes a sequence of queries in the particular category such that, once a response is found, the other category items need not be explored further. The logic means create this third data selection without user input and stores the data in the list tables of FIG. 3. This may be employed, for example, in determining proper attribution of a sale of securities for purposes of record-keeping and commission payments. For example, in the transaction category, one might establish the following hierarchy:

1. transaction level
2. account level
3. fund level
4. rep code level
5. branch level This is set up so that the higher item is on the hierarchy, the more specific it will be, and satisfaction of a more specific inquiry means that one deliver more general information from a lower hierarchical category. For example, if one is seeking a particular event in the transaction category, upon getting a match at the transaction level, the system will deliver this information to the list table. Failure to get a transaction level assignment means that the account level is explored and, if an assignment exists, that is employed. This practice is followed in descending order of preference through the branch level. Once an assignment is obtained, this information is delivered to a list table in FIG. 3. It is preferred to employ at least two of these fields in the hierarchy.

Similarly, with respect to the account hierarchy in determining the business entity or individual to get credit for an account, the sequence may be as follows:

1. account level
2. fund level
3. rep code level
4. branch level

The present invention makes extensive use of parallel processing and database performance tuning techniques in order to establish efficient and rapid processing and retrieval. In employing this hierarchical approach to determine an answer based on this hierarchical approach, the third data which represents the updated original data is provided in relational tables. These tables are searched by parallel processing and data base tuning techniques so as to employ the hierarchical technique in determining the most specific category of sales or account entry contained within the data. This hierarchical selection occurs within the computer and is not visible to the user.

Figure 8A:
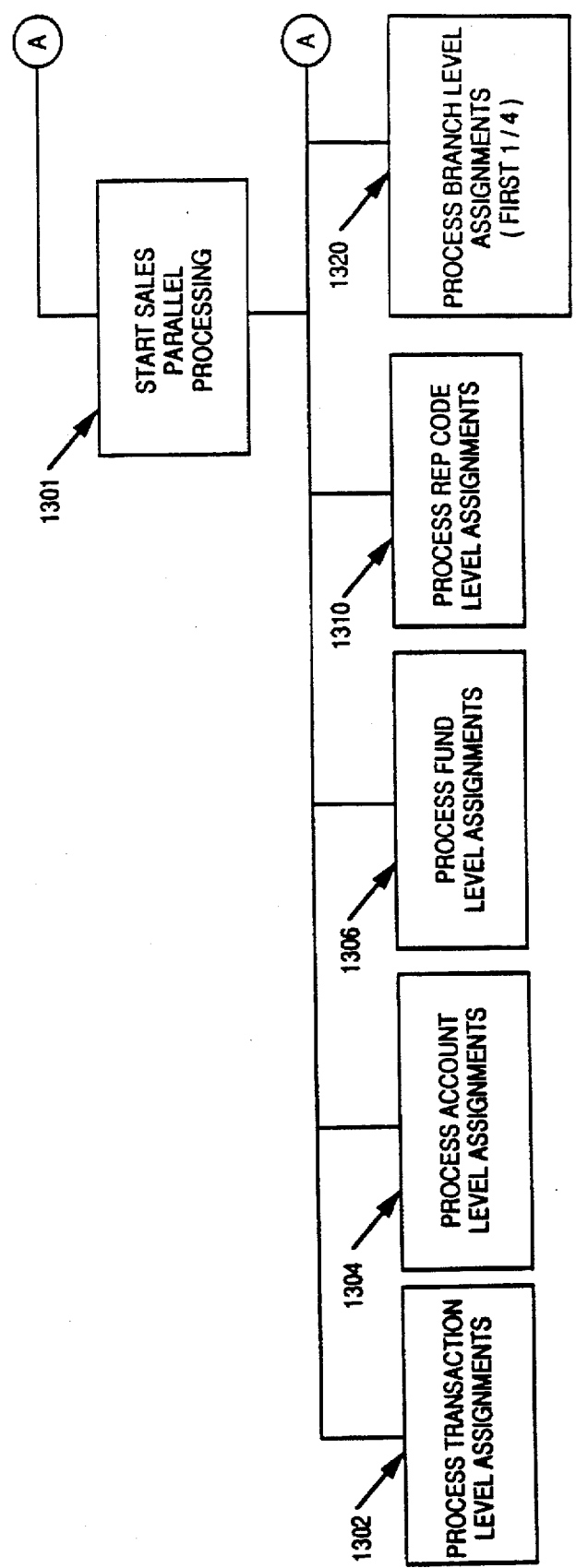
FIGS. 8a–8c, when assembled, are a logic diagram showing a preferred hierarchical data processing sequence.
Figure 8B:
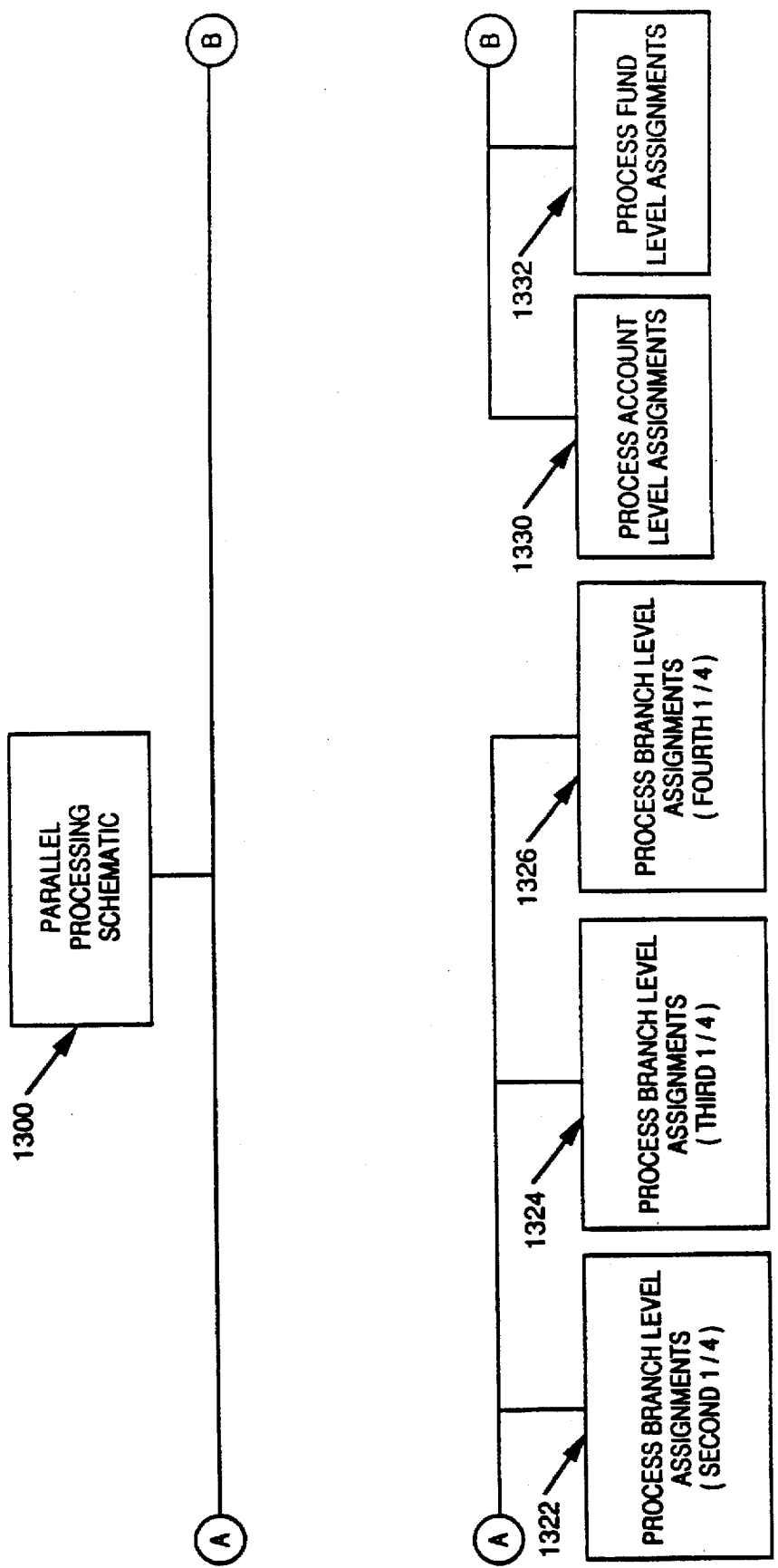
Figure 8C:
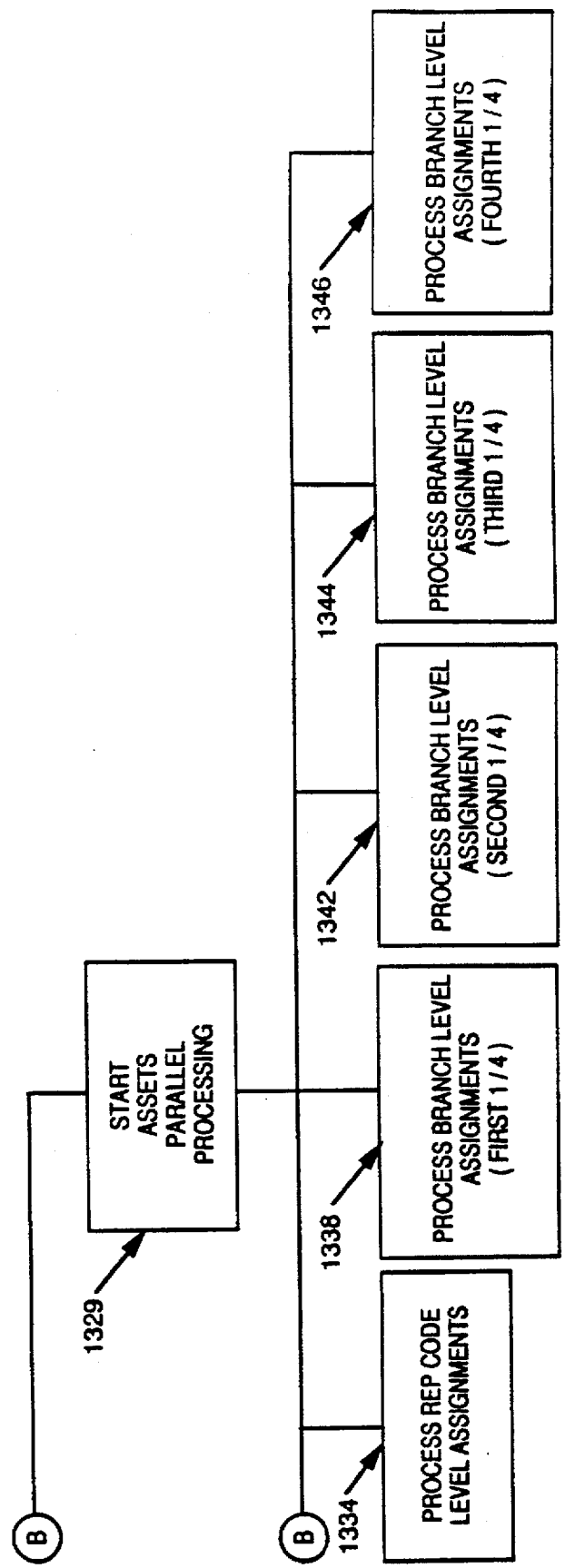

Referring to FIGS. 8a, 8b, 8c, which assemble according to matching letters and which provides a schematic of the preferred parallel processing system 1300. It will be appreciated that in the sales parallel processing 1301, as the list of five categories progresses from the most specific, i.e., transaction level to the most general. i.e., branch level, the branch level will have great deal more data to be sorted. As a result, in the sales processing approach, the transaction level assignments 1302 may be processed simultaneously with the processing of account level assignments 1304 and the processing of fund level assignments 1306, as well as the rep code level assignments 1310. The broadest category which involves the branch level assignments is, in the form shown, subjected to parallel processing of one-fourth of the data in each of the categories 1320, 1322, 1324, 1326. The simultaneous or parallel processing engaged in under the sales parallel processing 1301 enhances the speed of processing, while permitting the desired hierarchical processing. The logic means would for the sales parallel processing 1301, be provided with logic functions, such that if an assignment is found at the transaction level 1302 (positive data regarding a transaction), this is delivered to the list tables of FIG. 3. If there is an assignment in a process account level assignment 1304, but no process transaction level assignment 1302, the account level assignment is delivered to the list tables. Similarly, in each of the elements of the descending hierarchy, if an assignment is found and there is no assignment from a higher level category, then the data for that level will be delivered to the list tables by the logic means. Similarly, with respect to asset parallel processing 1329, the asset list in the preferred embodiment disclosed is identical with the sales list except for the absence in the asset list of the transaction level. Parallel processing will be initiated with the account level assignments 1330, the fund level assignments 1332, the rep code level assignments 1334, and four categories of branch level assignments 1338, 1342, 1344, 1346. The logic means employs similar hierarchical selection based upon the assignments to deliver information to an asset list tables which may be generally similar to the sales list tables of FIG. 3. Whereas, in the sales category, an assignment may mean identification of category positive information relating to a unit to receive credit for a sale, in the asset category assignment means positive identification of a unit to receive credit for a given asset.

It will be appreciated that as the categories get broader, when one descends the levels in accordance with the hierarchy, substantially more data is likely to exist in lower ranking levels. In order to expedite processing of the data, parallel processing employing a division of the data into multiple units, such as the one-quarter division in respect of branch level information 1320, 1322, 1324, 1326 in respect of the sales figures shown in FIG. 8. It will be appreciated that for different levels and different volumes, a different breakdown may be employed while, nevertheless, obtaining advantage of the parallel processing concepts of the present invention.

It will be appreciated that the hierarchical system of assignment, in combination with the dynamic screen which eliminates fields for which no information is provided, facilitate user friendly, efficient operation in accessing potentially millions of information units of third data in a rapid and efficient manner. This is contributed to in a substantial way by the previously discussed system which makes efficient use of list joinings and field groupings and labeled fields so as to combine information to provide the desired accurate and efficiently functioning system.

It will be appreciated, therefore, that the present invention provides a method and apparatus for updating large volumes of transactions which may be in the order of millions per day so as to permit user friendly access to various parameters selected by the user. The system may employ uniquely configured logic means which may be software operable on a general purpose digital computer to convert it into a computer configured to perform the disclosed function or may be hardware components performing the same function or a combination thereof.

It will be appreciated that the sales information of FIG. 6 and the asset information of FIG. 7 are provided on separate screens. In addition, if desired, to employ a spreadsheet, one might export the data to a suitable spreadsheet by means of software such as that marketed by Microsoft Corporation under the trade designation Microsoft Excel or Lotus 1-2-3 by Lotus Development Corporation, for example. The system is compatible with many other systems as it can produce comma separated variable (csv).

In a preferred practice of the present invention, the system may employ as a platform one or more pre-existing software systems. A preferred approach is to employ the Oracle and SQL* forms which are respectively database software and user interface software of the Oracle Corporation. To the extent to which the system will employ a spreadsheet feature, the software marketed under the trade designation Microsoft Excel by Microsoft Corporation may be employed advantageously. Reflection software, available from Walker Richard Quinn of Seattle, Wash. may be employed to enhance efficiency of moving data into the Microsoft system. In lieu of Microsoft Windows, which is a preferred approach to the present invention, it may readily be employed with Apple Computer, Inc. Macintosh systems. Other IBM compatible systems may also be employed.

While the disclosure herein has made specific reference to the use of the system with mutual fund investment monitoring and record-keeping, it will be appreciated that the system may also be employed for various other types of other investment securities.

While reference has been made herein to the preferred user interface screen employing labeled fields due to speed and simplicity, the user may, if desired, be solicited by a series of questions or other means.

Whereas particular embodiments of the invention have been described above for purposes of illustration, it will be appreciated by those skilled in the art that numerous variations in the details may be made without departing from the invention as described in the appended claims.

I claim:

1. A data processing system for maintaining, updating and accessing investment information comprising computer means for receiving and processing said data, said computer means having data storage means, said data storage means having means for storing data including the following categories of data: dealer information, dates, transactions, identity of the investment, asset information and sales information, first data including data in at least one of said categories stored in said means for storing, said computer means having means for receiving and processing second data relating to said at least one of said categories, said computer means having means for comparing said second data with said first data and modifying existing first data to create third data which is stored in said data storage means, said computer means having user interface means for selecting and retrieving data in at least one said category from said third data, and said user interface means permitting information requests with respect to said categories in the form of a first option for specific information or a second option for all information or a third option for less information than said first option and said second option.

2. The data processing system of claim 1 including
said user interface having at least one of said first, second and third options being a default request.

3. The data processing system of claim 2 including
said data storage means having logic means for obtaining specific information through hierarchical processing of at least a portion of said third data.

4. The data processing system of claim 3 including
said logic means having means for establishing said hierarchical listing in priority sequence going from the most specific designation to the most general designation.

5. The data processing system of claim 4 including
said logic means which after obtaining a positive response third data on one level delivering said positive response third data to said data storage means if there is no positive response third data at a higher level.

6. The data processing system of claim 5 including
said logic means employing parallel processing in said scanning of said hierarchical listing.

7. The data processing system of claim 6 including
said hierarchical listing having information regarding the classes of organizations and individuals that may receive credit for a sales transaction.

8. The data processing system of claim 4 including
said computer logic means having means for interpreting a plurality of hierarchical levels simultaneously by parallel processing.

9. The data processing system of claim 8 including
said computer logic means employing in said categories in descending order of preference a transaction level, an account level, a fund level, a rep code level and a branch code level.

10. The data processing system of claim 9 including
said computer logic means, if it finds a transaction at said transaction level, will deliver data on said transaction to a list table in said data storage means.

11. The data processing system of claim 10 including
said computer logic means, if it finds an account at the account level, and no transaction at said transaction level, will deliver data on said account to said list table.

12. The data processing system of claim 11 including
said computer logic means interpreting each said level and if it receives data at a said level and does not receive data from a higher said level, will deliver said data to said list table.

13. The data processing system of claim 12 including
said user interface screen displaying said list table hierarchical entry without a specific field entry in said field by said user.

14. The data processing system of claim 8 including
said computer logic means employing in said categories in descending order of preference an account level, a fund level, a rep code level and a branch code level.

15. The data processing system of claim 14 including
said computer logic means interpreting each said level and if it receives data at a said level and does not receive data from a higher said level, will deliver said data to said list table.

16. The data processing system of claim 2 including
means for delivering said second data to said computer means from a remote location.

17. The data processing system of claim 16 including
said means for receiving and processing data having means for receiving and processing said second data which includes both revisions to said first data and additions to said first data.

18. The data processing system of claim 17 including
said means for receiving and processing said second data including a plurality of storage tables.

19. The data processing system of claim 18 including
said storage tables having at least one of a dealer organization table, a branch table, a branch organization table, an address table and an account table.

20. The data processing system of claim 19 including
said means for receiving and processing said having means for processing second data relating to account information, and
said storage tables having at least one of an account table, a representative code table, a representative person table and a person table.

21. The data processing system of claim 20 including
said means for receiving and processing having means for receiving and processing said second data regarding transactions.

22. The data processing system of claim 21 including
said computer means having a wire order table which receives information regarding wire orders in process, and
said receiving and processing means having means for distributing reformatted information to said storage tables.

23. The data processing system of claim 21 including
said information regarding transactions including information regarding at least one of sales, redemptions, reinvestment and exchanges.

24. The data processing system of claim 16 including
said data storage means having means for storing said third data including a plurality of third data storage tables each having informational fields relating to at least one of said categories.

25. The data processing system of claim 24 including
said means for receiving and processing said second data having means for assimilating and reformatting said second data to be entered into first data to create said third data.

26. The data processing system of claim 1 including
said data processing system being a data processing system for maintaining and updating investment information for mutual funds.

27. The data processing system of claim 26 including
said data processing system being a system for maintaining and updating mutual fund investment information selected from the group consisting of sales information and asset information.

28. The data processing system of claim 1 including
user interface means receiving third data from said data storage means,
said user interface means having said first option within a field related to a said category of selecting specific said third data relevant to said field, and
said computer logic means in the event said first option in said user interface means is elected by said user having means for generating code to select said specific third data for said field for retrieval.

29. The data processing system of claim 28 including
said user interface means having said second option within a field related to a said category of selecting all said third data relevant to said field, and said computer logic means in the event said second option in said user interface means is elected by said user having means for generating code to group information lists containing all said third data in said field for retrieval.

30. The data processing system of claim 29 including said user interface means having said third option within a field related to a said category of selecting group a summary of said third data relevant to said field, and said computer logic means in the event said third option is elected in said user interface is elected having means for generating a code to join list tables containing said third data to provide a summary of all said third data in said field.

31. The data processing system of claim 30 including repeating said user interface means and said computer logic means functions as to each said field, and providing the resultant information as to said fields on-line to said user.

32. The data processing system of claim 31 including said user interface means employing the absence of a user response in a said field as said third option.

33. The data processing system of claim 30 including said computer logic means responsive to a user election of said first option or said second option in addition to generating code for said respective first option or said second option will also generate said code for said third option, whereby user election of said first option or said second option in addition to generating code for said options will generate the code for said third option.

34. The data processing system of claim 22 including said computer logic means having a plurality of fields corresponding to fields displayed on said user screen.

35. The data processing system of claim 34 including said computer logic means have at least two fields selected from the group consisting of firm field, management code field, dealer number field, branch code field, rep code field, rep name field, division field, department field, region field, representative field, acronym field, fund name field, share class field and fund number field.

36. The data processing system of claim 35 including said computer logic means having means for scanning said fields in the sequence listed.

37. The data processing system of claim 36 including said computer logic means fields having at least six of said fields.

38. The data processing system of claim 35 including said computer logic means in said management code field, said dealer number field, said branch code field and said rep code field each have a first inquiry as to whether said firm field has a user created entry or not.

39. The data processing system of claim 38 including as to each said field other than said firm field after a branch in the logic sequence is pursued based upon whether the firm field had a screen entry or not, the next succeeding question is whether the particular category involved is blank or not with said logic means proceeding to pursue said first option or said second option only if an entry has been made in the field of said specific category.

40. The data processing system of claim 38 including said computer logic means having means for repeating said response to user requests for each field on said screen.

41. The data processing system of claim 30 including said computer logic means having a first logic tree for a first field with one branch being employed if said second option is elected and another branch being employed if said first option is elected, and said user computer logic means having at least one additional logic tree downstream of said first logic tree relating to a different field and having different branches dependent upon which branch is employed in said first field.

42. The data processing system of claim 41 including each said additional logic tree relating to a said different field having in each branch options based upon the user option elected as to said different field.

43. The data processing system of claim 42 including said computer logic means having a plurality of said additional logic trees.

44. The data processing system of claim 42 including said interface means having means for displaying on-line said third data requested by said user, and display means having a dynamic screen, whereby fields which do not have retrieved said third data will disappear from the screen.

45. The data processing system of claim 44 including said computer logic means including means for determining the business entity or individual to receive credit for a transaction, and said means for determining employing a hierarchical list approach whereby a positive response to any field in the hierarchical list will result in no further scanning of said list.

46. The data processing system of claim 45 including said computer means being capable of processing in excess of about 10,000 information units of said second data within a 24 hour period.

47. The data processing system of claim 41 including said computer logic means having a date field for determining the time reference before scanning said first field.

48. The data processing system of claim 1 including said user interface means providing a plurality of labeled fields on a screen, and said user interface means being responsive to user requests by a first response indicating specific information in said field is desired or by a second response indicating all the information in a field is desired or a third response indicating summary information in said field is desired.

49. The data processing system of claim 48 including one of said user responses being failure to enter information in a said field.

50. A method for maintaining, updating and retrieving investment information comprising providing data storage means for storing data containing information including the following categories of data: dealer information, dates, transactions, identity of investment, asset value and sales information, storing in such means for storing, first data including data in at least one of said categories, inputting second data relating to said at least one of said categories, comparing said second data with said first data and creating third data by effecting updating changes in said first data with said second data, storing said third data in list tables, and inputting through a user interface information in at least one said field of a said category to elect a first option to receive restricted said third data in a said field or a second option to receive all said third data in a said field or a third option to receive summary third data with respect to said field.

51. The method of claim 50 including electing one of said options by a user default entry in said field.

52. The method of claim 51 including providing in said second data both revisions to existing first data and additions to said first data.

53. The method of claim 50 including employing a plurality of said fields on a user interface means screen.

54. The method of claim 53 including employing in said computer means a plurality of storage tables to store said first data and receive said second data.

55. The method of claim 54 including employing as said storage tables at least one table selected from the group consisting of organization table, branch table, a branch organization table, an address table, and an account table.

56. The method of claim 55 including employing said method with respect to account information and employing in said method at least one table selected from the group consisting of account table, representative table, a representative person table and a person table.

57. The method of claim 56 including said second data including information regarding transactions, and introducing said second data transaction information into a transaction table.

58. The method of claim 50 including employing said process for maintaining and updating investment information relating to mutual funds.

59. The method of claim 58 including employing said data system to maintain and update mutual fund investment information selected from the group consisting of sales information and asset information.

60. The method of claim 59 including including in said mutual fund investment information regarding at least one type of transaction selected from the group consisting of sales, redemptions, reinvestments and exchanges.

61. The method of claim 60 including employing with respect to said second option means which group a plurality of list tables of said third data, and employing with said first option a restricted grouping of third data.

62. The method of claim 61 including employing as said third option means said default entry, and joining a first list table to a summary table responsive to user election of said third option.

63. The method of claim 62 including employing in said user interface list tables stored said third data corresponding to labeled fields on the user's display screen.

64. The method of claim 63 including responsive to said user electing as to a said field said first option generating in said computer means code to restrict said third data delivered to a specific said third data field.

65. The method of claim 64 including responsive to said user electing as to a said field said second option generating in said computer means code to group third data fields for delivery to said user.

66. The method of claim 65 including providing said third option response to said user even if said user has elected said first option or said second option for said field.

67. The method of claim 66 including repeating said third data retrieval as to each field on said user interface screen.

68. The method of claim 61 including providing with respect to a first field a first logic tree and responsive to user election of said second option joining said third data from different list tables and responsive to user election of said first option selecting restricted third data.

69. The method of claim 68 including employing a series of logic trees each related to a said field for providing said third data with respect to said field.

70. The method of claim 69 including each said logic tree having a first branch and a second branch which are employed or not employed as a function of the user having elected said first, second or third options.

71. The method of claim 70 including employing sub-branches within each said first and second branch depending on whether said user elected said first option or said second option.

72. The method of claim 71 including employing said system with said second data including at least 10,000 information units received within a 24 hour period.

73. The method of claim 50 including repeating said process as to each said field for each said user election.

74. The method of claim 50 including after creating said third data but prior to storing said third data in said third data list tables hierarchically processing said third data, employing said method to determine attribution of sales by hierarchical means by providing a series of business entity or individual identifying fields in increasing generality as the list of fields is descended, terminating the search when one level has a positive entry, and no higher level has a positive entry, and delivering said entry to said third data list table.

75. The method of claim 74 including searching a said list of hierarchical fields which contains at least two fields selected from the group consisting of transaction level, account level, fund level, representative code level and branch level.

76. The method of claim 75 including employing parallel processing in searching said hierarchical fields.

77. The method of claim 75 including displaying on-line said third data sought by said user, and withdrawing from the display screen fields which have no entries.

78. The method of claim 74 including effecting said search at hierarchical levels employing parallel processing.

79. The method of claim 78 including employing said hierarchical levels in descending order of preference a transaction level, an account level, a fund level, a rep code level and a branch level.

80. The method of claim 79 including if said search finds a transaction at said transaction level, data regarding said transaction will be delivered to a said list table.

81. The method of claim 80 including if said search finds an account at said account level and finds no transaction at said transaction level, delivering the data regarding said account to said list table.

82. The method of claim 81 including interpreting each said level and if it receives data at a said level and does not receive data at a higher said level, delivering said data from said level to said list table.

83. The method of claim 82 including delivering to said user interface screen said hierarchical data entry without a specific field entry in said field by said user.

84. The method of claim 83 including employing is said hierarchical levels in descending order of preference an account level, a fund level, a rep code level and a branch level.

85. The method of claim 50 including employing in said computer means logic means for processing data for at least six fields selected from the group consisting of firm field, management code field, dealer number field, branch code field, representative code field, representative name field, division field, department field, region field, acronym field, fund name field, share class field and fund number field.

86. The method of claim 85 including interpreting each of said fields in said computer means in the sequence listed in claim 78.

87. The method of claim 85 including employing in said computer means logic means with respect to each said field two logic branches, and selecting the same said third data for said user third option election regardless of which logic branch is used.

88. The method of claim 85 including employing said firm field as one of said fields, and employing as to each other said field interpreted after said firm field two logic branches the use of which branches is dependent on the user election in said firm field.

* * * * *

UNITED STATES PATENT AND TRADEMARK OFFICE
CERTIFICATE OF CORRECTION

PATENT NO. : 5,749,077
DATED : May 5, 1998
INVENTOR(S) : DAVID CAMPBELL

It is certified that error appears in the above-identified patent and that said Letters Patent is hereby corrected as shown below:

Column 7, lines 53 and 54, ""XYZ." should be --"XYZ."--.

Column 10, line 50, "(FIG. 41)" should be --(FIG. 4i)--.

Column 13, line 60, "1226:" should be --1226.--.

Claim 46, line 1, "said" should begin a subparagraph.

Signed and Sealed this

Thirteenth Day of July, 1999

Attest:

Q. TODD DICKINSON

Attesting Officer

Acting Commissioner of Patents and Trademarks